United States Patent [19]

Spaulding et al.

[11] Patent Number: 5,337,919
[45] Date of Patent: Aug. 16, 1994

[54] AUTOMATIC DISPENSING SYSTEM FOR PRESCRIPTIONS AND THE LIKE

[75] Inventors: Gregory L. Spaulding; Pamela M. Spaulding, both of Manhattan, Kans.; Kenneth M. Bueche, Friendswood, Tex.

[73] Assignee: Dispensing Technologies, Inc., Manhattan, Kans.

[21] Appl. No.: 16,812

[22] Filed: Feb. 11, 1993

[51] Int. Cl.⁵ ............................................. G07F 11/00
[52] U.S. Cl. ......................................... 221/2; 221/13; 221/127; 221/206; 221/225; 221/254; 221/258; 221/265; 221/DIG. 1
[58] Field of Search .................... 221/2, 7, 8, 9, 13, 221/92, 127, 129, 130, 131, 206, 210, 225, 254, 256, 258, 261, 262, 265, 277, DIG. 1

[56] References Cited

U.S. PATENT DOCUMENTS

| | | |
|---|---|---|
| 2,088,038 | 7/1937 | Scott et al. ............................. 221/258 |
| 2,178,000 | 10/1939 | Siehrs ................................... 221/258 X |
| 2,348,927 | 5/1944 | Runsvold et al. ...................... 221/277 X |
| 2,781,947 | 2/1957 | Webster et al. . |
| 2,929,532 | 3/1960 | Tonelli ................................. 221/262 X |
| 3,045,864 | 7/1962 | Hurst et al. . |
| 3,193,196 | 7/1965 | Merrill et al. . |
| 3,206,062 | 9/1965 | Rappaport . |
| 3,215,310 | 11/1965 | Hurst et al. . |
| 3,368,713 | 2/1968 | Hurst et al. . |
| 3,677,437 | 7/1972 | Haigler ................................. 221/7 |
| 3,692,211 | 9/1972 | Flubacker ............................ 221/9 |
| 3,746,211 | 7/1973 | Burgess, Jr. . |
| 3,782,590 | 1/1974 | Apfel . |
| 3,823,844 | 7/1974 | Linkemer et al. . |
| 3,837,139 | 9/1974 | Roseberg . |
| 3,871,156 | 3/1975 | Koenig et al. . |
| 3,885,702 | 5/1975 | Joslin et al. . |
| 3,917,045 | 11/1975 | Williams et al. . |
| 3,985,264 | 10/1976 | Shaw et al. . |
| 3,997,063 | 12/1976 | Adams et al. . |
| 4,013,192 | 3/1977 | Pillon ................................... 221/7 |
| 4,018,358 | 4/1977 | Johnson et al. ...................... 221/7 |
| 4,247,019 | 1/1981 | Lerner . |
| 4,546,901 | 10/1985 | Buttarazzi . |
| 4,811,764 | 3/1989 | McLaughlin . |
| 4,869,394 | 9/1989 | Hurst . |
| 5,208,762 | 5/1993 | Charhut et al. ...................... 221/9 X |

FOREIGN PATENT DOCUMENTS

| | | | |
|---|---|---|---|
| 6082130 | 5/1985 | Japan ................................... 221/2 X |
| 2259988 | 10/1990 | Japan ................................... 221/7 X |

Primary Examiner—Robert P. Olszewski
Assistant Examiner—Dean A. Reichard
Attorney, Agent, or Firm—Shook, Hardy & Bacon

[57] ABSTRACT

An automatic prescription dispensing system includes a housing or frame having a plurality of pill dispenser units mounted therein, a plurality of vial supply assemblies at one end of the housing, and a filled vial offload carousel at an opposite end. A vial manipulator assembly is mounted on the housing to enable translational movement of a vial manipulator frame vertically and horizontally and pivoting about a vertical axis to retrieve vials from the supply assemblies, fill the vials at the dispenser units, and deposit the filled vials onto the carousel. The vial manipulator frame includes spring loaded grippers to engage and carry the vials and a drive motor and gear for meshing with dispenser unit gears to operate the dispenser units. The system includes a controller including an interface for coupling to the printer port of a pharmacy host computer printer port for intercepting drug name and quantity data for a prescription which was directed to a prescription label printer. Such prescription data is used by the controller for selecting the dispenser unit having the required drug, vial size, and number of pills to be dispensed.

34 Claims, 8 Drawing Sheets

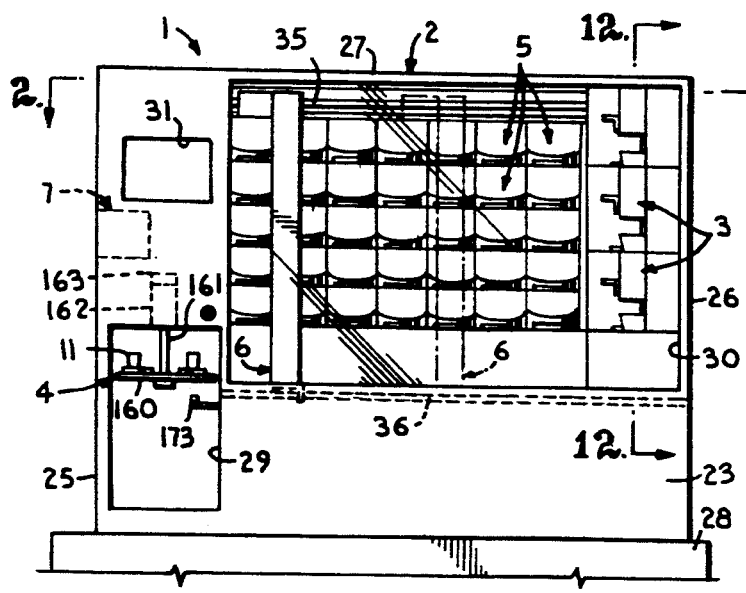
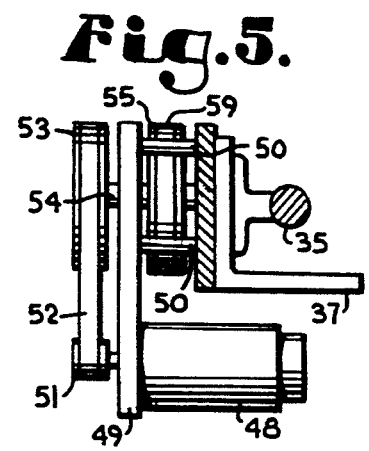
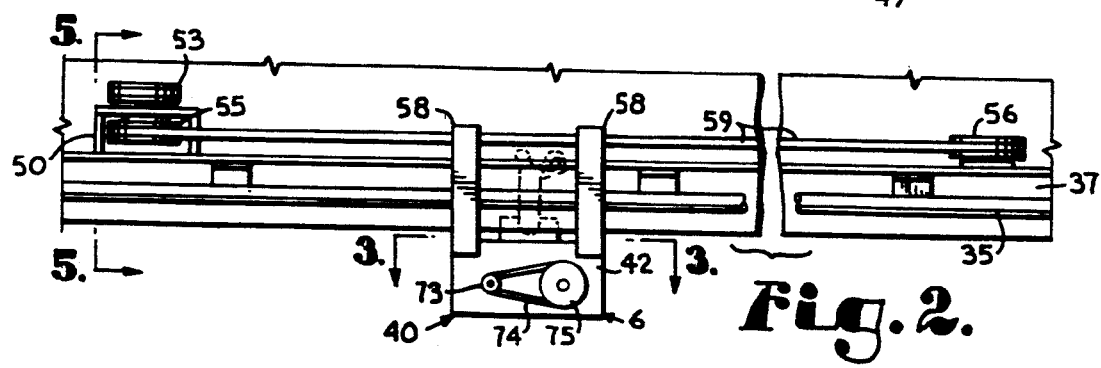
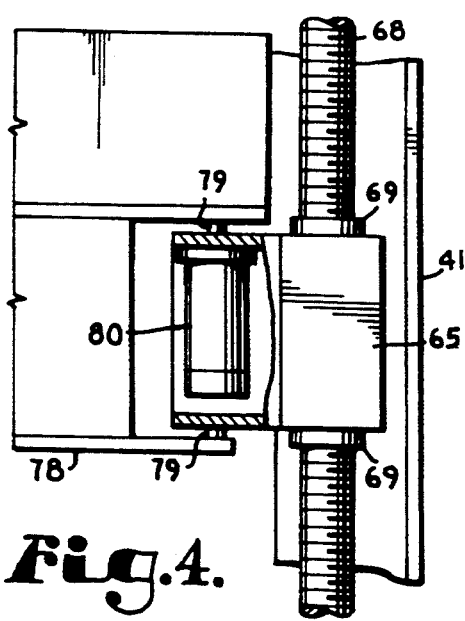
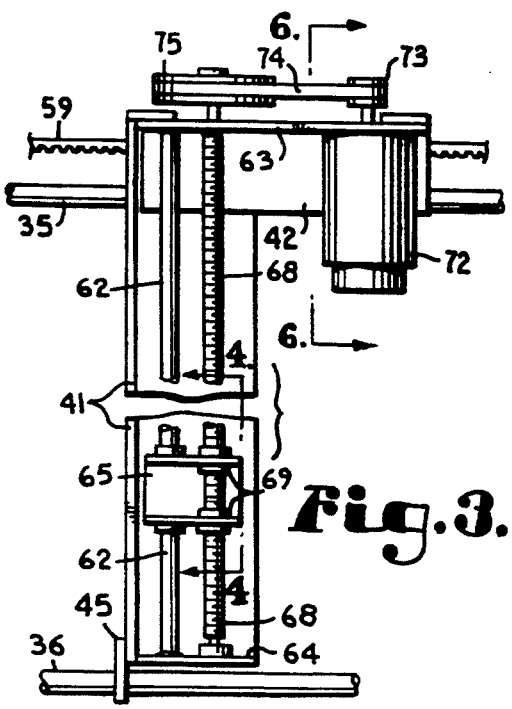

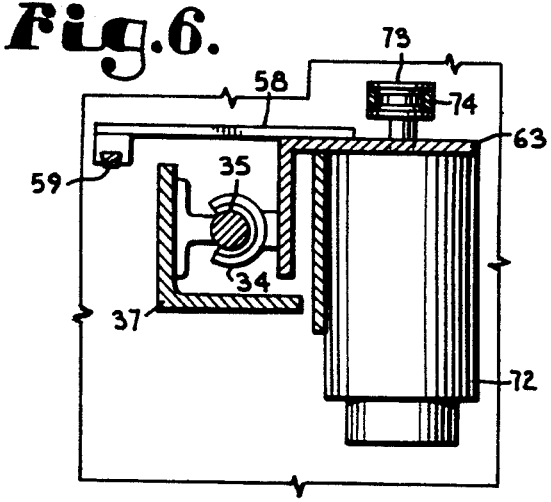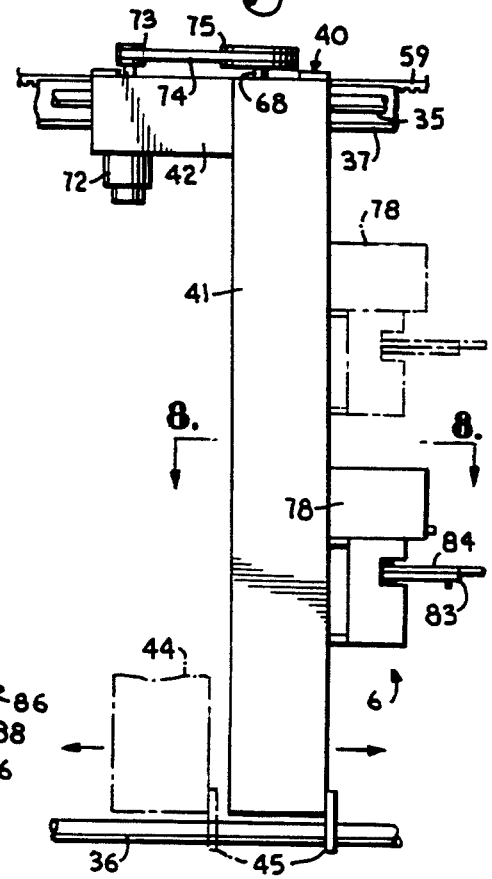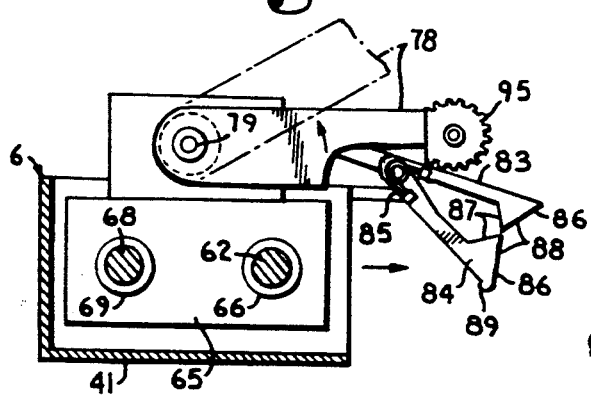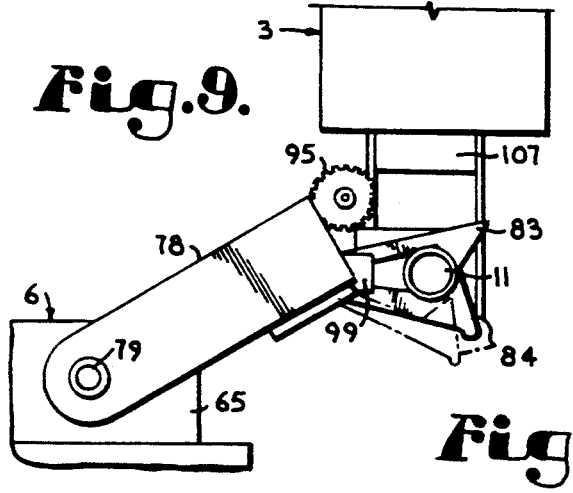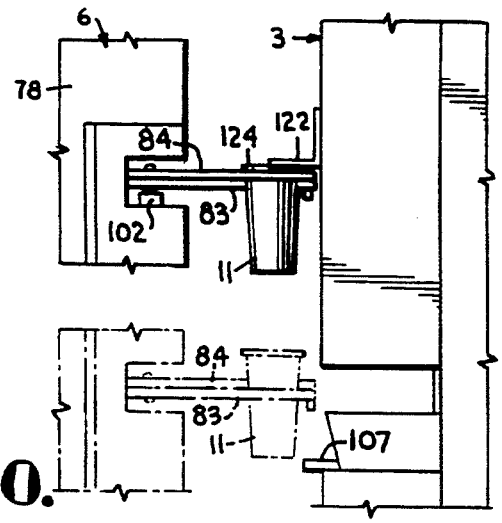

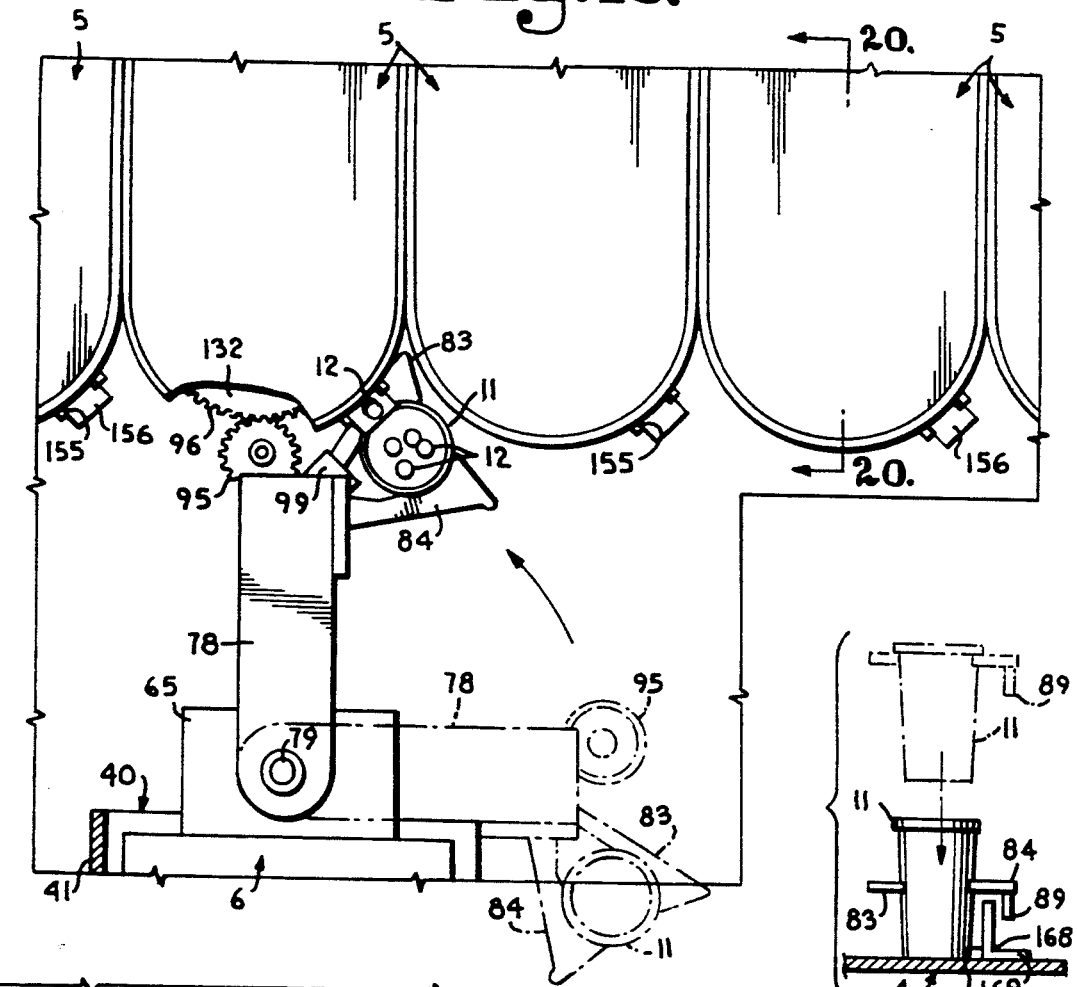
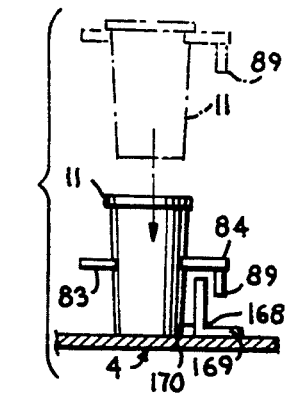
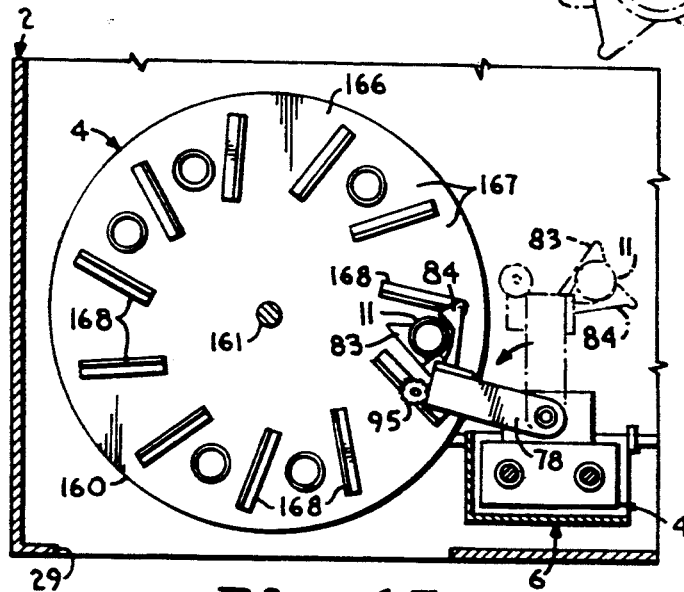
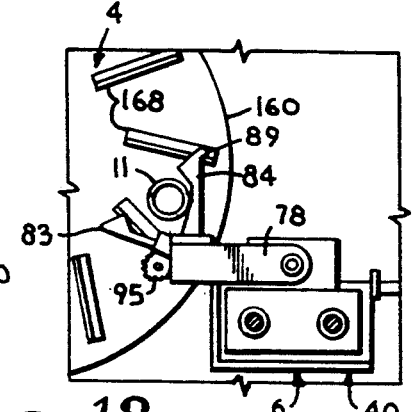

AUTOMATIC DISPENSING SYSTEM FOR PRESCRIPTIONS AND THE LIKE

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, labeling a prescription, and transferring the dispensed medication to the patient. However, a new emphasis is beginning to arise, which is counseling in addition to merely dispensing medications. This entails educating the patient regarding the proper use and corresponding information about the medication that is needed to ensure proper therapeutic results and safety.

The trend toward more counseling is taking place to reduce medication errors and, thereby, decrease liability and insurance costs associated with the increase of medication use as the proportion of elderly persons in the population grows. Counseling is considered a major issue, and many states are changing their laws to make counseling mandatory. With counseling a mandatory requirement, pharmacists have to take on the role of educators and counselors regarding medications. One study showed that one out of five prescriptions was prescribed and dispensed without any verbal instructions to the patient. Without verbal instruction, patients will be extremely reluctant to make difficult choices and decisions about complicated therapeutic modalities. There will always be points that are not understood and questions that will have to be answered by the pharmacist, regardless of the degree of automation.

The main reason for the low level of consultation provided by pharmacists is a lack of time. Present day pharmacists devote more than sixty percent of their time to counting and pouting and other mundane tasks to meet quotas. This sixty percent does not include the time spent in locating the drug or reshelving the drug which in itself is a time consuming task. With the great emphasis being placed on counseling, and the economic reality of the volume of prescriptions filled, the conscientious pharmacist is faced with the dilemma of trying to satisfy the customers' needs as well as the need to make a profit.

Several attempts have been made to automate the pharmacy environment. One of these is the development of tablet counters. There are several types of tablet counters in existence today. In one type of counter, the pharmacist simply pours the tablets to be counted into a counting machine. The tablets are counted as they pass through the machine. This counter is simple and has the advantage that the tablets are stored in their shipped containers. However, this type of counter, as well as many other types of counters have the problem of cross contamination. As one type of drug is counted, a residue is left that can be picked up by the next drug which may cause a drug interaction or an allergic reaction. This counter also has problems with counting speed, double tablet counts, and half tablet counts. While this counter does reduce the tedious task of counting tablets, there is very little time savings because of the need to verify counts.

The Johnson et al. U.S. Pat. No. 4,018,358 discloses another type of commercially available counter which stores the drugs in special storage units or bins. When a prescription is to be filled, the proper bin must be located, removed from the shelf, inserted into a counter, and the desired number of tablets must be entered on a keyboard on the counter. When the entered number of tablets has been counted, the bin is removed from the counter and reshelved. The storage bin plus counter arrangement eliminates many of the problems of other counters, but still requires considerable tedious effort by the pharmacist and is prone to errors in selecting the correct bin and in entering the prescribed tablet count. Such counters are manufactured by Pharmaceutical Innovators, Ltd. of West Union, Iowa.

Still another type of dispenser is disclosed in the Lerner U.S. Pat. No. 4,247,019 and comprises a combined storage and counting unit called a Baker Cell. This device is based on technology which has been in existence for about fifteen years. Each cell is a storage unit having a volume of about one cubic foot and its own counter. The pharmacist locates the cell with the desired drug and enters the number of tablets to be dispensed on a keyboard of the cell. The tablets are then dispensed from a chute on the cell. Some of the newer models have computer interfaces allowing the computer to control the number of tablets dispensed. The Baker Cell has many serious practical problems. The pharmacist has to select the proper sized vial to use and physically locate the proper cell. The cells are large, occupying considerable shelf space. The cells cannot be bought, only leased at a considerable price per cell. The cells are set by the manufacturer to dispense a particular medication. If the pharmacist wants to change the type of medication dispensed, the cell must be returned to the manufacturer for recalibration. Baker Cell units are available from Automated Packaging Systems, Inc. of Twinsburg, Ohio.

While the current tablet dispensing devices attempt to aid the pharmacist in the task of dispensing, the time savings they provide are extremely limited in actual practice and in some cases are obtained at considerable cost. Each of the current dispensing devices only solves pain of the problem.

It can be concluded that there is a need for a fully automated device for retrieval and accurate counting of tablets and elimination of shelving requirements for stocks of tablets. Such a device should provide the flexibility to change the tablets being dispensed in a convenient way and should be able to dispense tablets without cross contamination of one medication with the next. Such a device should preferably be able to interface to a pharmacy's existing computer system.

SUMMARY OF THE INVENTION

The present invention provides a fully automated system for filling prescriptions which greatly reduces the tedious aspects of filling prescriptions consisting of pills, tablets, capsules, caplets, or other types of pelletized dosage units, referred to herein generically as pills. In a preferred embodiment of the present invention, a plurality of pill dispenser units or cells, each loaded with a selected prescription drug, are mounted centrally on a system frame or housing. A plurality of prescription container or vial supply assemblies are mounted at one end of the frame, and an offload carousel is mounted on the frame on an opposite end from the vial suppliers. A vial manipulator assembly is mounted on the frame for movement in an X-Y plane between the ends of the frame and for pivoting about a vertical axis to enable it to move among the vial supply assemblies, the dispenser cells, and the offload carousel. A control system is interfaced with the vial suppliers, the vial manipulator, the offload carousel, and the printer port of a pharmacy host computer. Data representing the spatial coordinates of the vial supply assemblies, the dispenser units, and the offload carousel is stored in memory within the controller.

The pharmacy host computer is normally used for keeping records of prescriptions filled for customers or patients and for prescription inventory tracking. In addition, the computer usually has the capability of causing prescription labels to be printed by a label printer interfaced to the computer by way of the printer port. The control system of the dispensing system of the present invention includes a host computer interface which connects to the pharmacy host computer printer port and which conveys label print data to the control system, which extracts the drug name and quantity of dosage units from the label print data. The drug name is used by the control system to select the dispenser cell having a stock of dosage units of the same drug name specified in the prescription. The quantity data is used to control the number of dosage units dispensed.

The illustrated system has three vial supply assemblies, although more or fewer assemblies could be employed. Each vial supply assembly includes a bin which receives a plurality of vials of a selected size therein in random orientation. The vials are simply poured into the vial bin. A motorized vial pickup or wheel, having a plurality of somewhat sickle shaped arms, rotates through the vials in the bin, thereby stirring and changing the orientation of the vials. If there is a sufficient number of vials in the bin, a sickle arm will, after a short time, catch a vial by upward movement of the end of a sickle arm through the vials. On the down side of the path of the sickle arm, the caught vial slides off the sickle arm, down a chute, and lands on a vial retrieval platform. This action breaks a photoelectric beam which stops the motion of the sickle wheel motor. When the vial is removed from the platform, the photoelectric beam is restored, and the sickle wheel motor resumes rotation until another caught vial breaks the photoelectric beam. The operation of the vial supply assemblies is substantially independent, only requiring a master on/off control through the main control system.

Each of the dispensing cells includes a trough to receive a supply of pills. The trough is oriented at a downward angle to feed the pills onto a rotary dispenser feed disk. A feed impeller positioned axially of the feed disk, and rotating therewith, cooperates with a feed gate to urge a single layer of pills therethrough. The preferred impeller is of an arcuate triangular shape, although other shapes are envisioned. The feed gate is formed by a flexible planar member which is somewhat resilient and which is lightly urged into tangency with the impeller. The tangent end of the feed gate is slit to form at least one feed finger having a height which is adapted to retard pills stacked on a lower layer of the pills from being fed into a pill outlet chamber. The height of the feed finger can be adjusted to accommodate different sized pills or other types of pelletized or encapsulated materials.

The pill outlet chamber is defined by the surface of the feed disk, an outer wall of the dispenser, and a feed fence which extends arcuately outward from the impeller toward a pill feed port. Cooperation between the feed disk and the feed fence and the frictional engagement between the feed disk and the pills cause the pills to singulate in a line along the fence. The sequential spacing between the pills and, thus, the feed rate of the pills, can be controlled by controlling the rotary speed of the feed disk. The feed disks of the dispensers may be individually motorized; however, in the present invention, the feed disks are driven by the vial manipulator, as will be detailed below.

The vial manipulator includes an upper and a lower guide rail mounted horizontally on the system housing or frame and having a manipulator standard extending between and slidably connected to the rails. Opposite ends of a horizontal drive belt are connected to the standard, and the belt passes around a drive pulley at one end and an idler pulley at the other end. The belt is toothed for positive drive, and operation of a reversible horizontal drive motor causes the standard to be moved between opposite ends of the rails.

A vertical guide rail extends along the standard and has a manipulator frame slidably mounted thereon. A jack screw or lead screw extends parallel to the vertical rail and has a vertical drive nut threaded thereon. The nut is connected to the manipulator frame such that rotation of the jack screw, by a reversible drive motor, causes the manipulator frame to be moved vertically along the vertical rail. The manipulator frame has a manipulator arm pivotally connected thereto, and a reversible manipulator arm pivot motor is connected between the manipulator frame and arm, whereby operation of the pivot motor pivots the arm about a vertical axis through a range of about 180 degrees.

A pair of vial grip fingers are mounted on the manipulator arm, one finger being stationary relative to the arm and the other being pivotally connected to the stationary finger and having an outer end resiliently urged toward an outer end of the stationary finger. Each of the fingers has a cam surface which is angled inwardly. The fingers grippingly engage a vial on one of the retrieval platforms by pivoting the manipulator arm toward the selected vial supply assembly and adjustment of the horizontal and vertical positions of the manipulator frame in such a manner that the grip finger cam surfaces engage the vial, thereby opening the fingers and snapping the fingers about the vial. At least one of the vial supply assemblies has a vial indexing bracket with which the rim of the gripped vial is engaged to properly and consistently orient the vial relative to the grip fingers.

The offload carousel is positioned on the opposite end of the system housing from the vial supply assemblies and includes a rotatably mounted horizontal disk which is rotated by a carousel motor. An outer ring of the carousel disk is divided circumferentially into vial pickup sectors by vial gripper release cams which cooperate with the movable gripper finger of the manipulator to release a filled vial onto the carousel. The movable gripper finger has a depending pin or roller which engages a release cam when the filled vial is set onto the carousel. When the manipulator frame is pivoted and the carousel remains stationary, the movable gripper finger is opened to release the vial.

A carousel photocell is positioned relative to the carousel, such as therebelow, to sense whether a pickup sector has a vial located therein. Normally, a filled vial is deposited onto the next available pickup sector in the direction of rotation of the carousel. If all of the sectors are filled, an alert is sounded to indicate a need to retrieve previously filled prescriptions to make room for the currently filled vial. When a filled vial is off-loaded onto the carousel and released, the carousel is rotated to bring the latest filled vial to the front of the system housing for retrieval by the pharmacist. A manual index control or switch is also included for manually indexing the carousel.

In dispensing the pills of a dispenser unit into a vial, the pills are counted by a pill counter photocell mounted on the vial manipulator frame and, additionally, weighed by a pill weight scale connected between the gripper fingers and the vial manipulator frame. This provides a redundancy which ensures accuracy of the prescription. The average weight of the first five pills is determined and compared to the total weight of the prescription. A detected discrepancy can indicate a miscount, a broken tablet, an incorrect tablet or the like. If a discrepancy is detected, an alert is sounded or may be indicated by an indicator light or LED on an annunciator panel, by an error code printed on the label, or by an error message displayed on the CRT.

The automatic prescription dispensing system is capable of greatly enhancing the productivity of a pharmacist by robotically performing the tedious aspects of filling prescriptions, thereby allowing the pharmacist to better concentrate on entering the prescription data, checking the filled prescription, and counseling the pharmacy customers regarding their prescriptions.

OBJECTS AND ADVANTAGES OF THE INVENTION

The principal objects of the present invention are: to provide an automatic prescription dispensing system; to provide such a system wherein stocks of prescription pills and the like are held within dispenser units and stocks of prescription vials of various sizes are held in vial supply assemblies and wherein the system is controllable to cause a vial of a proper size to be transferred to the dispenser unit having the prescribed drug, the correct quantity of pills dispensed into the vial, and the vial transferred to an offload location for retrieval by a pharmacist; to provide such a system wherein a vial is gripped and conveyed by a vial manipulator assembly which operates in a manner similar to an X-Y plotter mechanism and which includes a pivoting vial manipulator frame with vial grippers and a dispenser motor/gear set to drive the operation of the selected dispenser unit; to provide such a system wherein the vial supply assemblies are replenished by pouring a supply of vials of the proper size into a supply bin without regard to orientation and wherein the vial supply assembly selects a vial and properly orients a vial on a retrieval platform; to provide such a system in which the pills of each prescription are counted and weighed as a cross check for accuracy; to provide such a system in which each of the dispenser units includes a pill supply trough feeding onto a pill feed disk having a feed impeller which cooperates with a feed gate to feed a single layer of pills into a pill feed chamber of the unit and which includes a feed fence which cooperates with the frictional engagement of the pills with the feed disk and the centrifugal force imparted to the pills by the rotating feed disk to singulate a line of pills along the feed fence leading to a pill feed port in the outer wall of the dispenser unit; to provide such a system wherein prescription data indicating the drug name and quantity is received from a pharmacy computer system which is normally employed to print prescription labels, among other uses; to provide such a system which may be employed with a great variety of pharmacy computers without the need for programming the system for individual computers by interfacing the controller of the system to the printer port of the pharmacy computer, intercepting the prescription label data and extracting the drug name and quantity therefrom; to provide such a system which avoids cross contamination of prescription drugs by employing a separate dispenser unit for each drug and by operating in such a manner that the drug contacts no intervening media between the dispenser unit and the vial which will be received by the customer or patient; to provide such a system wherein the dispenser units and vial supply assemblies can be conveniently replenished; to provide such a system which greatly decreases the tedious aspects of filling prescriptions; and to provide such an automatic prescription dispensing system which is economical to manufacture, which is convenient and accurate in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a front elevational view at a reduced scale of an automatic prescription dispensing system embodying the present invention.

FIG. 2 is a fragmentary longitudinal sectional view taken on line 2—2 of FIG. 1 at a somewhat enlarged scale and illustrates details of a horizontal drive mechanism of a vial manipulator of the system.

FIG. 3 is an enlarged fragmentary sectional view taken on line 3—3 of FIG. 2 and illustrates details of a vertical drive mechanism of the vial manipulator.

FIG. 4 is a further enlarged fragmentary sectional view taken on line 4—4 of FIG. 3 and illustrates a manipulator pivot motor which pivots the vial manipulator frame about a vertical axis.

FIG. 5 is an enlarged fragmentary sectional view taken on line 5—5 of FIG. 2 and illustrates further details of the horizontal drive mechanism for the vial manipulator.

FIG. 6 is an enlarged fragmentary sectional view taken on line 6—6 of FIG. 3 and illustrates details of the horizontal guide arrangement of the vial manipulator.

FIG. 7 is a fragmentary front elevational view of a vertical support standard of the vial manipulator of the system.

FIG. 8 is an enlarged fragmentary sectional view from above, taken on line 8—8 of FIG. 7, and illustrates details of the pivoting vial manipulator, with an alternate position shown in phantom lines.

FIG. 9 is a view similar to FIG. 8 and illustrates the vial manipulator with gripper fingers engaged about a prescription vial on a retrieval platform of a vial supply assembly.

FIG. 10 is an enlarged fragmentary front elevational view of one of the vial supply assemblies and illustrates a vial orientation bracket for properly orienting a gripped vial, with a previous position of the manipulator and vial shown in phantom lines.

FIG. 15 is an enlarged fragmentary top plan view within the system housing illustrating the vial manipulator at one of a plurality of pill dispensers, with a travel position of the vial manipulator frame shown in phantom lines.

FIG. 16 is an enlarged fragmentary radial sectional view of an offload carousel of the system and illustrates the deposit of a filled vial onto the carousel, with an approach position of the gripped vial shown in phantom lines.

FIG. 17 is a fragmentary plan view illustrating the vial manipulator at the vial offload carousel, with an intermediate position of the vial manipulator frame shown in phantom lines.

FIG. 18 is a view similar to FIG. 17 and illustrates the vial manipulator pivoted to a vial release position to deposit a filled vial onto the offload carousel.

DETAILED DESCRIPTION OF THE INVENTION

Figure 11:
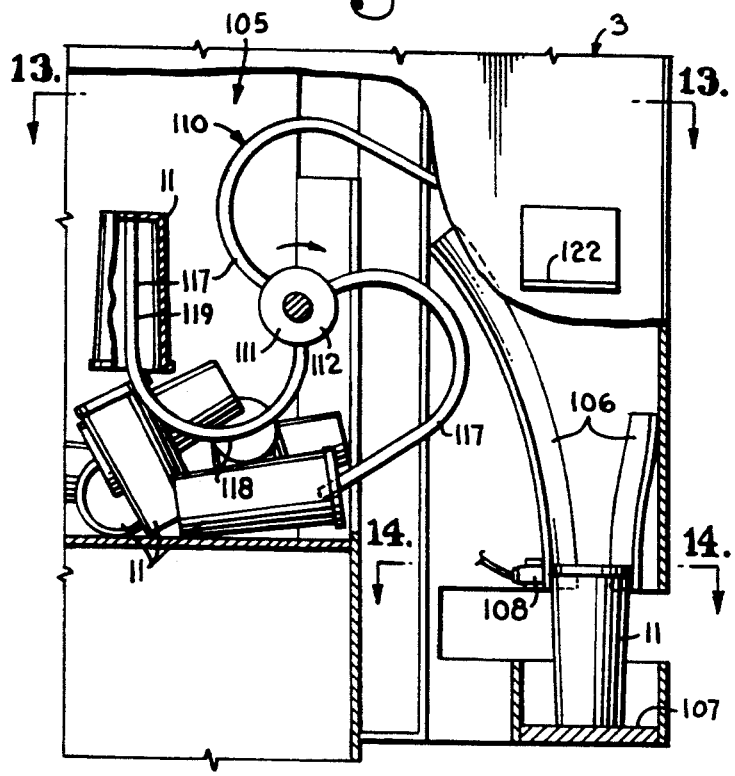
FIG. 11 is an enlarged fragmentary elevational view of a vial supply i₆assembly of the system, with portions broken away to illustrate details of a vial pickup wheel and a vial chute.
Figure 12:
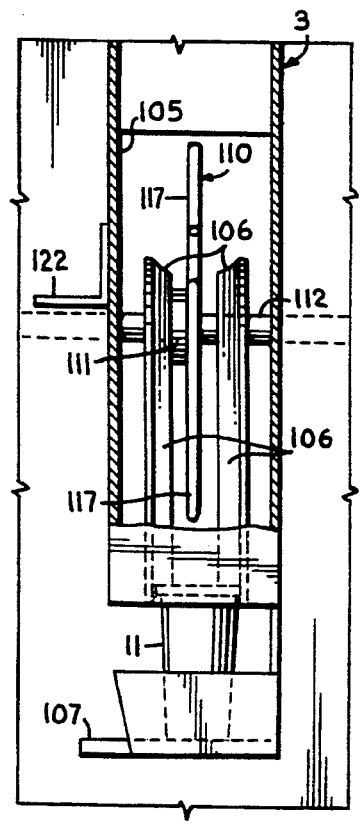
FIG. 12 is an enlarged fragmentary elevational view taken on line 12—12 of FIG. 1 with portions broken away to illustrate further details of a vial supply assembly of the system.
Figure 13:
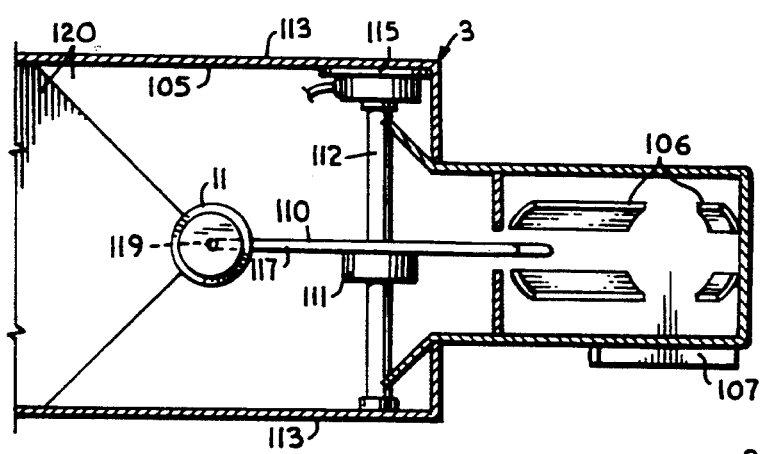
FIG. 13 is an enlarged fragmentary sectional view taken on line 13—13 of FIG. 11 and illustrates further details of the vial assembly.
Figure 14:
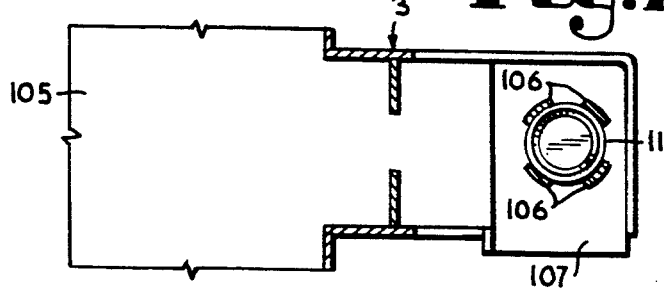
FIG. 14 is an enlarged fragmentary sectional view taken on line 14—14 of FIG. 11 and illustrates a vial retrieval platform of the vial supply assembly.
Figure 19:
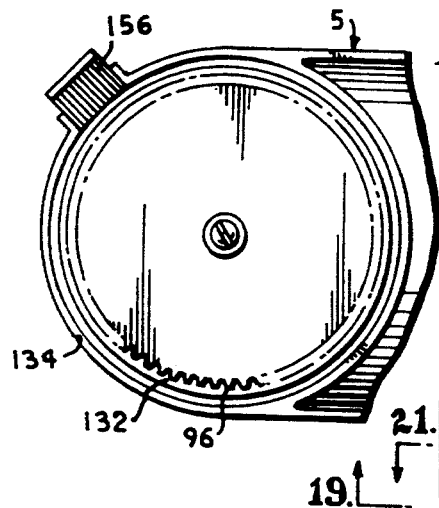
FIG. 19 is an enlarged fragmentary bottom plan view of one of the pill dispensers, taken on line 19—19 of FIG. 20.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates an automatic prescription dispensing system which embodies the present invention. The system 1 generally includes a system housing or frame 2 having a plurality of vial supply assemblies 3 at one end, a vial offload carousel 4 at an opposite end, a plurality of pill dispenser units 5 in a central area of the housing 2, a vial manipulator assembly 6, and a system controller 7.

In general, the system controller 7 intercepts prescription label print data, including a drug name and a quantity, from a pharmacy host computer 10 (FIG. 30), extracts the drug name and quantity from the label print data, and selects a dispenser unit 5 and a vial supply assembly 3 accordingly. The controller 7 then activates the vial manipulator assembly 6 to retrieve a vial 11 (FIG. 11) from the selected vial supply assembly 3 and convey the vial 11 to the selected dispenser unit 5, controls the vial manipulator 6 to activate the selected dispenser unit 5 to count out the required pills 12 into the gripped vial 11, controls the vial manipulator 6 to transfer the filled vial 11 to the offload carousel 4 and deposit the filled vial 11 onto the carousel 4, and controls the carousel 4 to rotate the latest filled vial 11 to the front of the housing 2.

Figure 30:
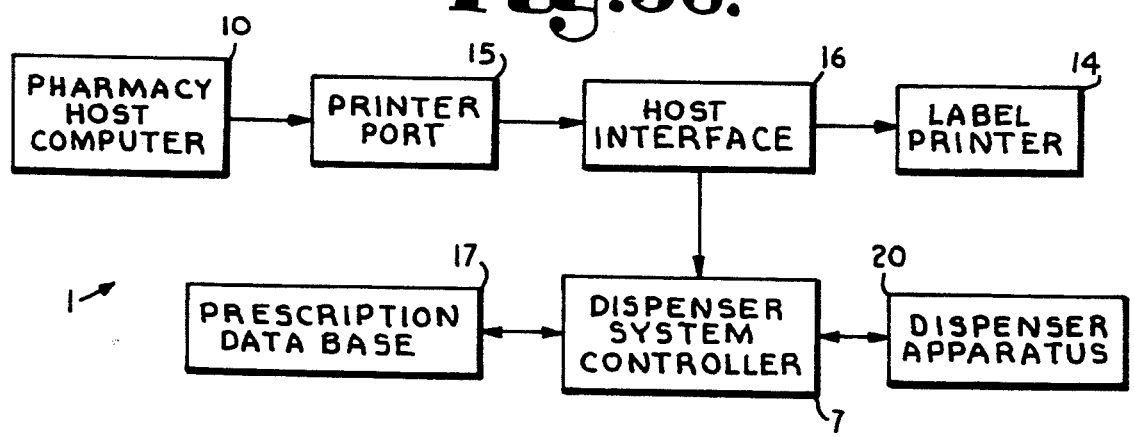
FIG. 30 is a simplified flow diagram illustrating operation of the automatic prescription dispensing system and illustrates the retrieval of print data from a pharmacy host computer printer port for extraction of drug name and prescription quantity data therefrom.

Referring to FIG. 30, the pharmacy host computer 10 is normally connected to a prescription label printer 14 by a host primer port 15 and sends prescription data therethrough to cause the printer 14 to print a prescription label with the drug name, quantity, dosage instructions, and additional data identifying the prescribing physician, the recipient, and the like. Normally, the prescription label data is coded in one of a limited number of standard data formats, such as ASCII coding, and the printer port usually adheres to a standard printer interface protocol, such as for serial printers, parallel (Centronics), or the like. This allows the pharmacy computer 10 to be used with any of a large number of commercially available printers 14. The system 1 employs the fairly high level of standardization in computer printers to obtain data for controlling the automatic dispensing of prescriptions by connecting a host interface 16 between the printer port 15 and the label printer 14.

The host interface 16 intercepts the prescription label data and conveys it to the controller 7, which is itself a computer. The controller 7 stores a prescription database 17 within memory (not shown) thereof. The drug name and the prescription quantity is extracted from the label data, and the drug name is searched within the database 17 to determine if one of the dispenser units 5 in the system 1 is loaded with the desired drug. If the drug name is in the database 17, the spatial coordinates of the dispenser unit 5 are retrieved from a data record associated with the drug name. The dispenser coordinates are used by the controller 7 to control the operation of the dispenser apparatus 20, in general, and the vial manipulator 6 in particular. The prescription label data is conveyed through the interface 16 to the label printer 14 to cause the printer 14 to print a label for the filled vial 11.

Figure 20:
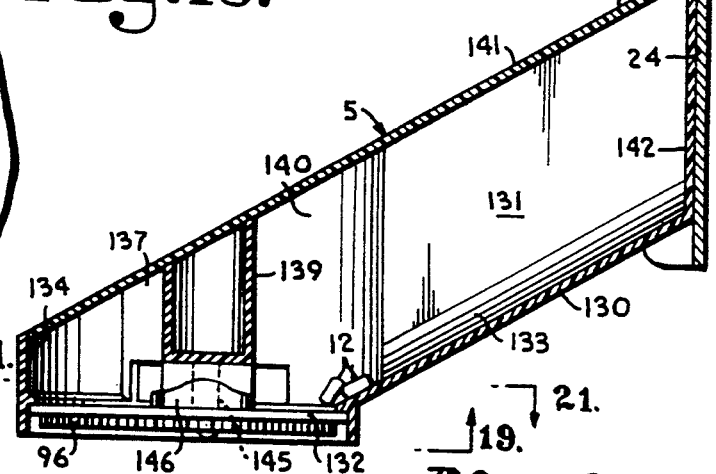
FIG. 20 is a cross sectional view on one of the pill dispensers, taken on line 20—20 of FIG. 15.
Figure 21:
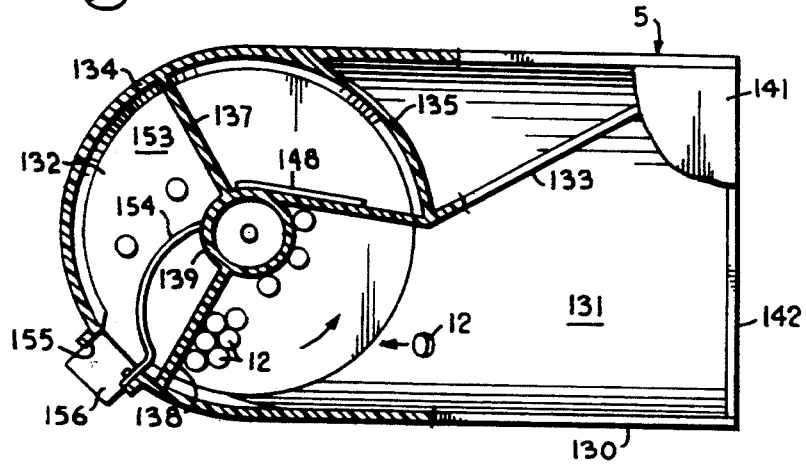
FIG. 21 is a cross sectional view taken on line 21—21 of FIG. 20 and illustrates internal details of one of the pill dispensers.
Figure 22:
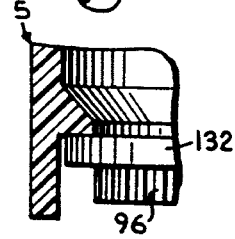
FIG. 22 is a greatly enlarged fragmentary radial sectional view taken on line 22—22 of FIG. 21 and illustrates a driven gear formed on a lower surface of a pill feed disk of the pill dispenser.
Figure 23:
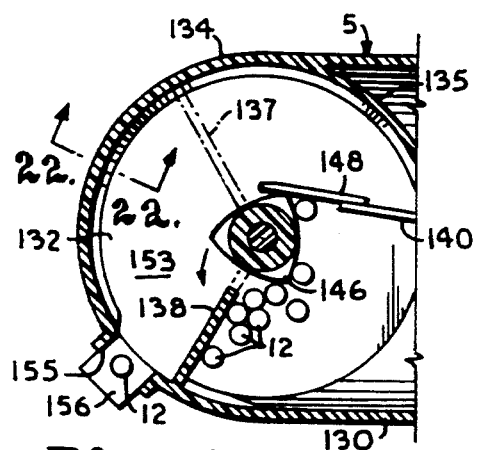
FIG. 23 is a view similar to FIG. 21 and a somewhat lower level and illustrates a pill feed impeller of the pill dispenser.
Figure 24:
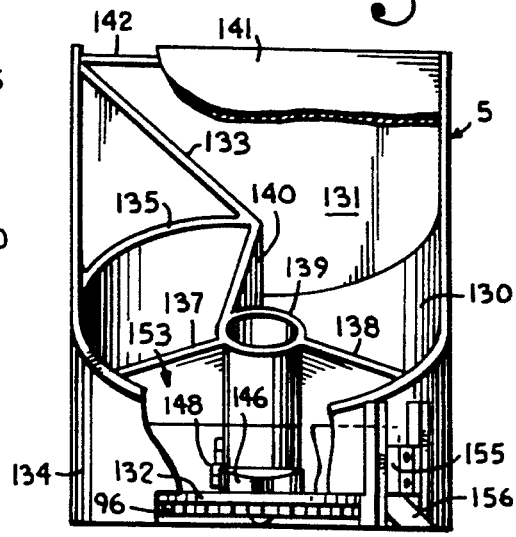
FIG. 24 is a front elevational view of a pill dispenser with portions of walls broken away to illustrate internal details of the pill dispenser.

The system housing 2 provides a framework to support and enclose the operating components of the entire system 1, except for an interface connector (not shown) for the host interface 16. The housing 2 includes a front wall 23, a rear wall 24 (FIG. 20), a left side wall 25 (as viewed in FIG. 1), a right side wall 26, and a top wall 27. The housing 2 may include a pedestal or base support 28 to bring the carousel 4 to a comfortable level for retrieving filled vials 11. A retrieval opening 29 is formed in the front wall 23 to enable access to the carousel 4. A larger dispenser cell access opening 30 is provided for access to the dispenser cells 5, as for replenishing them, and for maintenance or repair within the housing.

The openings 29 and 30 may be provided with transparent doors (not shown) which allow controlled access to the carousel 4 and dispensers 5 while shutting out environmental pollutants, such as smoke, dust, and the like. If the system 1 is to be used to dispense controlled substances, the doors may be provided with locks requiring keys or codes for entry. A readout or display panel 31 is preferably provided on the front wall 23 to provide status indications regarding the operation of the system 1, for example, system operation errors, exhaustion of pills in the dispensers 5, count/weight discrepancies, the lack of an available location on the carousel 4 to deposit a filled vial 11, and the like. The panel 31 may be provided with individual lights or LED's labeled for each function, or may be provided with numeric indicators (not detailed), and additionally may include a sounding device (not shown).

FIGS. 2–9 illustrate details of the vial manipulator assembly 6. Elongated upper and lower horizontal guides 35 and 36 respectively are positioned in vertically spaced parallel relation within the housing 2, the upper horizontal guides 35 being mounted on a cross member 37. A vertical support frame 40 includes a vertical support member or standard 41 and a vertical motor bracket 42. The vertical motor bracket 42 has a pair of C-shaped upper slide bearings 44 (FIG. 6) extending rearwardly therefrom to slidingly engage the upper horizontal guide 35. A lower slide bearing 45 depends from a lower end of the standard 41 (FIGS. 3 and 7) to slidingly engage the lower horizontal guide 36. The pair of upper bearings 44 prevent tilting of the vial manipulator assembly 6 in a lateral plane and binding on the upper guide 35, while the lower bearing 45 prevents pivoting of the assembly 6 about the upper guide 35.

Referring to FIG. 5, a horizontal manipulator motor 48 is mounted on a horizontal motor bracket 49 which is connected to the cross member 37 by spacers 50. A reduction pulley 51 is mounted on a shaft of the motor 48 and is connected by a transfer belt 52 to a transfer pulley 53 mounted on a drive shaft 54, along with horizontal drive pulley 55. A horizontal idler pulley 56 is journaled on the cross member 37 at the opposite end of the housing 2 from the drive pulley 55. A pair of horizontal drive arms 58 extend rearwardly from the vertical motor bracket 42. A manipulator horizontal drive belt 59 has opposite ends connected to the arms 58 and passes around the drive pulley 55 and the idler pulley 56. The motor 48 is interfaced to the controller 7 whereby the controller 7 selectively activates the motor 48 to cause horizontal movement of the vertical support frame 40 back and forth along the horizontal guides 35 and 36. The transfer belt 52 and the horizontal drive belt 59 are preferably toothed belts, and the pulleys 51, 53, 55, and 56 are toothed, for positive drive transfer from the motor 48 to the vertical support frame 40. The motor 48 may be a stepper motor for precise control thereof by the controller 7. Alternatively, a position encoder (not shown) may be incorporated within the motor 48 with feedback to the controller 7 for precise positioning of the vertical frame 40.

The vertical support frame 40 has a vertical manipulator guide 62 (FIG. 3) extending between an upper flange 63 of the vertical motor bracket 42 and lower flange 64 of the standard 41. A manipulator support frame 65 has a vertical slide bearing 66 slidably engaged with the vertical guide 62. A threaded vertical jack screw or lead screw 68 is journaled between the flanges 63 and 64 in parallel spaced relation to the vertical guide 62. The manipulator frame 65 has a pair of nuts 69 mounted thereon which threadedly engage the jack screw 68. Rotation of the screw 68 causes the manipulator frame 65 to travel vertically along the screw 68 and the vertical guide 62.

A vertical drive motor 72 is mounted on the lower side of the vertical motor bracket flange 63 and has a reduction pulley 73 mounted on a shaft thereof. A vertical drive transfer belt 74 is reeved about the reduction pulley 73 and a vertical drive pulley 75 mounted axially on the jack screw 68. Activation of the vertical drive motor 72 causes the jack screw 68 to be rotated and thereby cause the manipulator frame 65 to be moved vertically relative to the vertical support frame 40. The belt 74 and pulleys 73 and 75 are preferably toothed for positive drive transfer. The motor 72 is interfaced to the controller 7 and may be controlled in a similar manner.

Referring to FIG. 4, a manipulator arm 78 is pivotally connected to the manipulator support frame 65 for pivoting about a vertical axis defined by manipulator arm pivot pins 79. One of the pivot pins 79, such as the upper pin, is connected to the shaft of a manipulator pivot motor 80. The motor 80 is interfaced to the controller 7 which selectively activates the motor 80 to pivot the manipulator arm 78 through a range of about 180 degrees. This range of motion allows the manipulator arm 78 to pivot to the right, as viewed in FIG. 8, to retrieve empty vials 11 from the vial supply assemblies 3, to the rear, as viewed in FIG. 15 to position the gripped vial 11 to receive pills 12 from the dispenser cells 5, and to the left, as viewed in FIGS. 17 and 18, to deposit a filled vial 11 onto the carousel 4.

Referring to FIG. 8, the manipulator arm 78 has a pair of vial gripper fingers 83 and 84 mounted thereon. The finger 83 is stationary with respect to the manipulator arm 78, and the finger 84 is pivotally connected to the stationary finger 83. A spring 85 is engaged between the stationary finger 83 and the movable finger 84 and resiliently urges the outer end of the movable finger 84 toward the outer end of the stationary finger 83. Each of the fingers 83 and 84 has an engagement cam surface 86 on an outer side thereof and a gripping abutment surface 87 on an inwardly directed side thereof. The engagement cam surfaces 86 cause the movable finger 84 to be urged away from the stationary finger 83 when engaging a vial 11 at one of the vial supply assemblies 3, after which the movable finger 84 closes to cause the vial 11 to be gripped. The gripping abutment surfaces 87 form gripping teeth 88 in cooperation with the cam surfaces and engage the vial 11 to prevent the vial 11 from slipping out of the grip of the fingers 83 and 84. The movable finger 84 has a release pin 89 depending from an end thereof for use in opening the movable finger 84 to deposit the gripped vial 11 onto the carousel 4, as will be detailed below.

Figure 25:
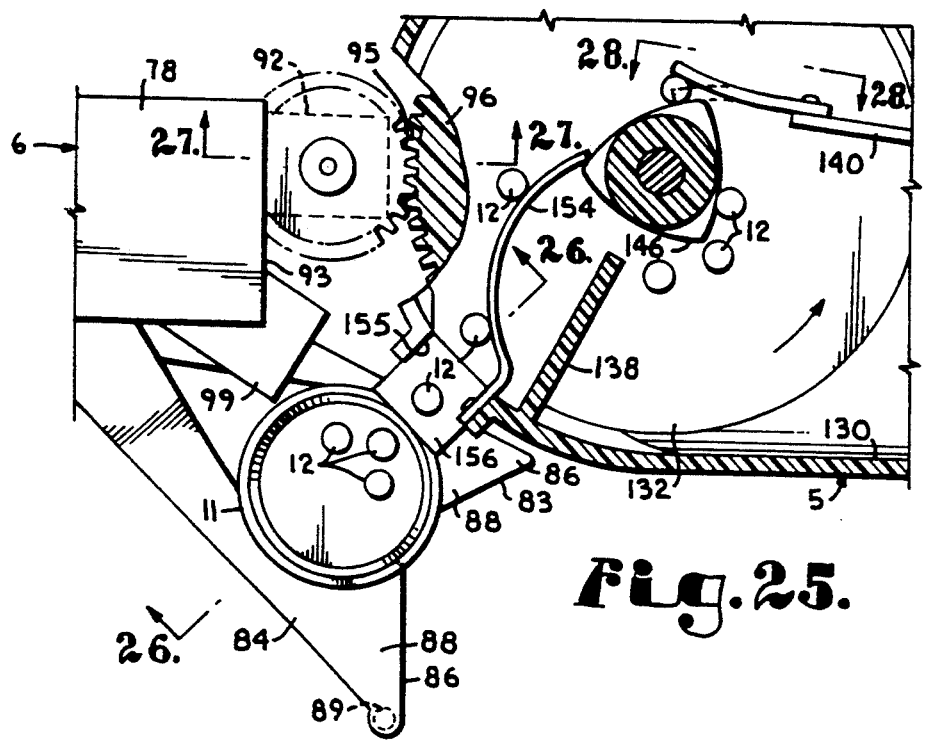
FIG. 25 is a greatly enlarged fragmentary top plan view illustrating the vial manipulator having a gripped vial at a pill dispenser and a dispenser drive gear on the manipulator engaging the driven gear of the dispenser, portions of the dispenser being broken away to illustrate details of the dispenser cell during pill dispensing.
Figure 27:
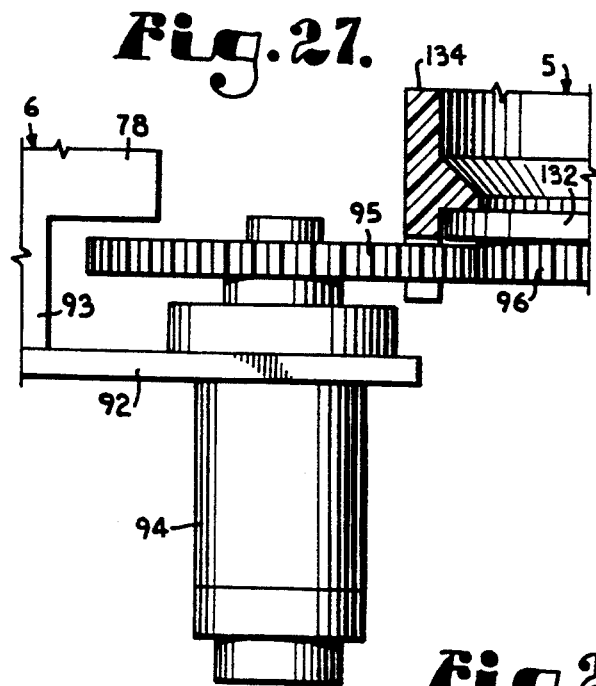
FIG. 27 is a cross sectional view taken on line 27—27 of FIG. 25 and illustrates engagement of the dispenser drive gear meshed with the dispenser driven gear and illustrates a dispenser feed drive motor.

Referring to FIGS. 15, 25, and 27, a dispenser drive bracket 92 extends from an outer end 93 of the manipulator arm 78. A dispenser drive motor 94 is mounted on a lower side of the bracket 92 and has a dispenser drive gear 95 mounted on a shaft thereof. The dispenser drive motor 94 is interfaced to the controller 7 and is positioned by the manipulator assembly 6 to mesh with a dispenser driven gear 96 of each dispenser cell 5 to cause the operation of the dispenser cell 5, as will be detailed below. Only a single dispenser drive motor 94 is employed in the system 1 to operate the dispenser cells 5, thereby simplifying and economizing the system 1.

The outer end 93 of the manipulator arm 78 is provided with a photoelectric counter unit 99 for use in counting the pills 12 dispensed by a dispenser cell 5 into a vial 11. The counter unit 99 is interfaced to the controller 7 and may include both a light source and a light sensor (not detailed separately) which operate using visible light, infrared light, or the like. The counter unit 99 senses light reflected by pills 12 passing through its beam. Alternatively, the counter unit 99 could be arranged to reflect light from a reflector (not shown) mounted on the dispenser cells 5 and to detect a break in the beam. Additionally, a light source (not shown) could be mounted on each dispenser cell 5 for detection of a beam interruption by the counter unit 99, although such an arrangement is not preferred.

The stationary finger 83 is pivotally connected to the manipulator arm 78 to enable pivoting about a horizontal axis (not shown) and engages a weight sensor 102 (FIG. 10) which is interfaced to the controller 7. The weight sensor 102 may operate on any of a number of principles which would occur to those skilled in the pertinent art, such as electrical resistance or capacitance or by a photoelectric arrangement, to sense the weight of pills 12 which have been dispensed into a vial 11. The sensed weight is used by the controller 7 as an accuracy check for comparison with the count provided by the counter 99.

The controller 7 may be programmed to compensate for the tare weight of a vial 11 by calibrating the weight sensor 102 to zero weight units with a vial 11 gripped by the fingers 83 and 84 prior to dispensing any pills 12 into the vial 11, each time a prescription is to be dispensed. In the preferred system 1, the weight of the first five pills 12 dispensed into a vial 11 is sensed and divided by five to determine the average pill weight. After the prescribed quantity of pills 12 has been dispensed, the weight is again sensed and compared to the expected weight for the number of pills 12. If a discrepancy exceeding a tolerable range is determined, an alert may be displayed on the display panel 31 or sounded therefrom to alert the pharmacist to manually check the count of pills 12.

Referring to FIGS. 11-14, each of the vial supply assemblies 3 includes a vial supply bin 105 into which are deposited a plurality of uniformly sized vials 11 in random orientation. Each bin 105 receives a respective standard size of vials 11, and the data indicating the size of vials 11 at a particular vial supply assembly 3 is programmed into the controller 7. Each assembly 3 includes elements forming a vial guide chute 106 which leads to a vial retrieval platform 107. A photoelectric vial presence sensor 108 is positioned at the bottom of the chute 106 to determine whether a vial 11 is positioned on the platform 107.

The vials 11 are engaged within the bin 105 and transferred to the vial chute 106 by a vial pickup wheel 110. The pickup wheel 110 includes a hub 111 which is affixed to a pickup wheel shaft 112 which is journaled between side walls 113 of the bin 105. A pickup wheel motor 115 is engaged between one of the side walls 113 and the shaft 112 and rotates the wheel 110 in a clockwise direction, as viewed in FIG. 11, when activated. The motor 115 is interconnected with the vial presence sensor 108 in such a manner that the motor 115 rotates the wheel 110 when no vial 11 is sensed on the platform 107 and ceases rotation of the wheel 110 when a vial 11 is sensed on the platform 107.

The pickup wheel 110 has a plurality of vial pickup arms 117 extending from the hub 111. The pickup arms 117 have a "sickle" or J-shape with a curved portion 118 near the hub 111 and straight end portions 119. As the arms 117 are revolved through the vials 11 in the bin 105, the vials 11 are stirred or churned to continually reorient the vials. If a sufficient number of vials 11 are present in the bin 105, the straight end 119 of one of the arms 117 will enter the opening of a vial 11, and the vial will be caught by the arm 117 and lifted up and over toward the chute 106. When the influence of gravity exceeds the mutual friction between the arm 117 and the vial 11, it will slip off the arm 117 and drop through the chute 106 to the platform 107 therebelow. Bottom walls 120 of the bin 105 are sloped downward toward the center of the bin 105 to channel the vials 11 toward an area for pickup by the arms 117. The elements forming the chute 106 are split to allow the pickup arms 117 to revolve therethrough. At least one of the vial supply assemblies 3 is provided with a vial orienting bracket 122. After a vial 11 is gripped by the fingers 83 and 84 of the vial manipulator 6, the gripped vial 11 is moved to engage an upper rim of the gripped vial 11 with a lower surface of the bracket 122 to properly orient the vial 11 within the grip fingers 83 and 84.

FIGS. 19-25 illustrate details of the pill dispenser units or cells 5. Each dispenser cell 5 includes a downwardly slanting curved wall 130 which forms opposite side walls and a lower wall of a pill supply trough 131. The trough 131 feeds pills onto a pill feed disk 132 in cooperation with a trough partition wall 133. The curved wall 130 merges into a front semi-cylindrical outer wall 134, which is continued internally by an inner cylindrical wall 135 which is somewhat less than a quarter of a cylinder and which connects with the trough partition wall 133. The outer front wall 134 has a pair of radial walls 137 and 138 extending inwardly therefrom at about 120 degree spacing and terminating at an inner cylinder 139. A feed gate support wall 140 extends radially toward the inner cylinder 139 from the junction of the inner cylindrical wall 135 and the trough partition 133 and merges into tangency with the inner cylinder 139. The dispenser cell 5 is closed at the top by a removable top wall 141 and at the rear by a rear wall 142. The walls forming the dispenser cells 5 may be formed of a synthetic resinous material, as by molding.

Figure 28:
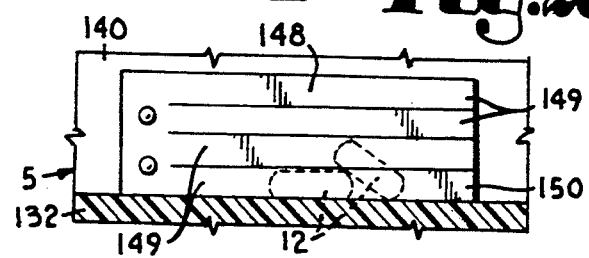
FIG. 28 is a fragmentary elevational view taken on line 28—28 of FIG. 25 and illustrates a dispenser feed gate which controls the passage of pills from a pill supply trough into a pill feed chamber.

The feed disk 132 is rotatably mounted on a feed disk spindle 145 (FIG. 20) which depends from a lower end of the inner cylinder 139. The disk 132 has a pill feed impeller 146 mounted axially thereon which rotates therewith. The rotational direction of the dispenser feed gear 95 is such as to cause the feed disk 132 to rotate in a counterclockwise direction, as viewed from above in FIGS. 21, 23, and 25. The illustrated impeller 146 is of a rounded or arcuate triangular shape; however, other shapes could conceivably be employed. A pill feed gate 148 is mounted on the feed gate support wall 140 and is formed by a plate of resilient material which is slit longitudinally to form a plurality of vertically stacked feed gate fingers 149 (FIG. 28). The feed gate 148 is resiliently urged toward tangency with the impeller 146 and rides on the surface thereof.

Figure 26:
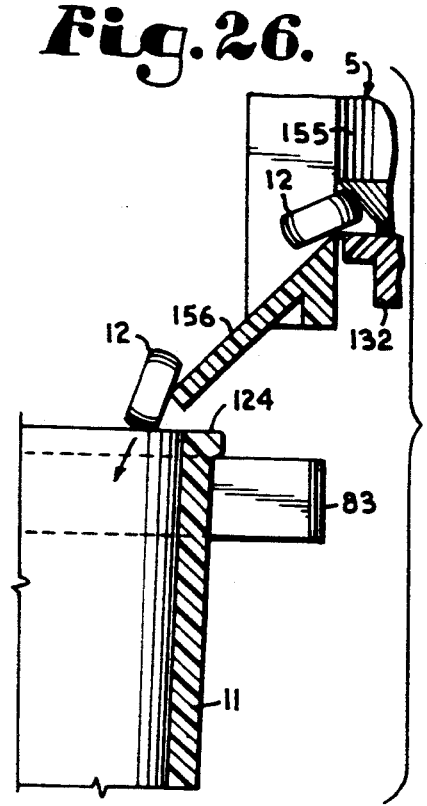
FIG. 26 is a cross sectional view taken on line 26—26 of FIG. 25 and illustrates pills being dispensed into a vial.

The lobes of the impeller 146 and the mutual friction between the upper surface of the feed disk 132 and the pills 12 urge the pills toward the feed gate 148. The degree of resilience of the feed gate 148 and vertical height of the fingers 149, particularly the lowermost finger 150, cooperate to feed one pill 12 at a time through the feed gate 148 into a feed chamber 153 formed by the outer front wall 134, the feed gate 148 and feed gate support wall 140, and a feed fence 154. The feed fence 154 is resilient and extends arcuately from the impeller 146 and a pill feed outlet port 155 formed through the front cylindrical wall 134. A pill feed outlet ramp 156 (FIG. 26) extends downward from the outlet port 155 and directs the pills from the feed disk 132 into a vial 11 positioned therebelow by the vial manipulator assembly 6.

The pills 12 are fed out past the feed gate 148 at substantially regular time intervals which are controlled by the rotational speed of the feed disk 132. Mutual friction between the pills 12 and the upper surface of the feed disk 132 carries the pills around into engagement with the feed fence 154 where the pills singulate or form a single file line along the inner part of the fence 154. The curvature of the fence 154 and the rotation of the feed disk 132 urge the pills 12 outwardly along the fence 154. As each pill 12 reaches the outer end of the fence 154, the outer portion of the fence 154 curves closer toward the circumferential direction of feed disk 132. This causes each pill 12 to speed up in a centrifugal, or radially outward, direction as it reaches the outer portion of the fence 154. Thus, as long as the feed disk 132 is rotating, the pills 12 are positively fed out at regular intervals. The feed rate of the dispenser cells 5 is directly proportional, within limits, to the rotational speed of the feed disk 132.

While the dispenser cells 5 have been described herein with particular reference to feeding out pelletized pharmaceuticals at regular intervals, such as the pills or tablets 12, it is also contemplated that an arrangement such as the dispenser cells 5 would have utility in feeding out other types of small discrete articles of similar size and shape and the like, such as seeds in a seed planter arrangement, parts, confections, general merchandise, or the like. Thus, the disclosed dispenser cells 5 are not intended to be restricted to use only within the prescription dispensing system 1 of the present invention.

FIGS. 1 and 16–18 illustrate details of the vial offload carousel 4 of the system 1. The carousel 4 is formed by a relatively large carousel disk 160 which is rotatably mounted within the housing 2 by an upstanding carousel shaft 161. A carousel drive motor 162 is engaged between members (not shown) within the housing 2 and the shaft 161 and is interfaced to the controller 7 which selectively activates the motor 162. The motor 162 may be a stepper motor or alternatively may incorporate means such as a shaft encoder 163 for precise control of the rotational position of the carousel disk 160. An outer ring 166 of the carousel disk 160 is divided into a plurality of offload sectors 167 by vial release cam members 168. In the illustrated system 1, there are twelve sectors 167 on the carousel disk 160, although a greater or lesser number can be employed. Each of the cam members 168 is formed by an elongated angle member having a base flange 169 and an upstanding cam flange 170 (FIG. 16).

A photoelectric vial detector 173 (FIG. 1) is connected to the controller 7 and positioned below the carousel disk 160 to determine which sectors 167 are open to receive a vial 11 from the vial manipulator assembly 6 after being filled. When the vial manipulator assembly 6 reaches an offload position near the carousel 4, the controller 7 rotates the carousel disk 160 to allow the vial detector 173 to find the next available sector 167 to receive the filled vial 11.

As the vial manipulator assembly 6 sets the filled vial 11 onto the carousel disk 160, the release pin 89 is positioned on the other side of the cam flange 170 from the vial 11 (FIG. 16). The manipulator arm 78 is pivoted to the left, as viewed in FIG. 17, engaging the release pin 89 with the cam flange 170, thereby separating the movable grip finger 84 from the stationary finger 83 and releasing the filled vial 11 onto the carousel disk 160. As the vial manipulator 6 is translated away from the carousel 4, the release pin 89 rides along the cam flange 170, retaining the fingers 83 and 84 in an open, released position to withdraw from the vial 11 just deposited. When the release pin 89 slips off the cam flange 170, the movable finger 84 again closes toward the stationary finger 83.

When the vial manipulator 6 withdraws from the carousel 4, the carousel disk 160 is rotated to the carousel opening 29 at the front of the housing 2 for retrieval by the pharmacist. If the filled vials 11 are not removed and all the offload sectors 167 become filled, the controller 7 will send an alert to the display panel 31.

Figure 29:
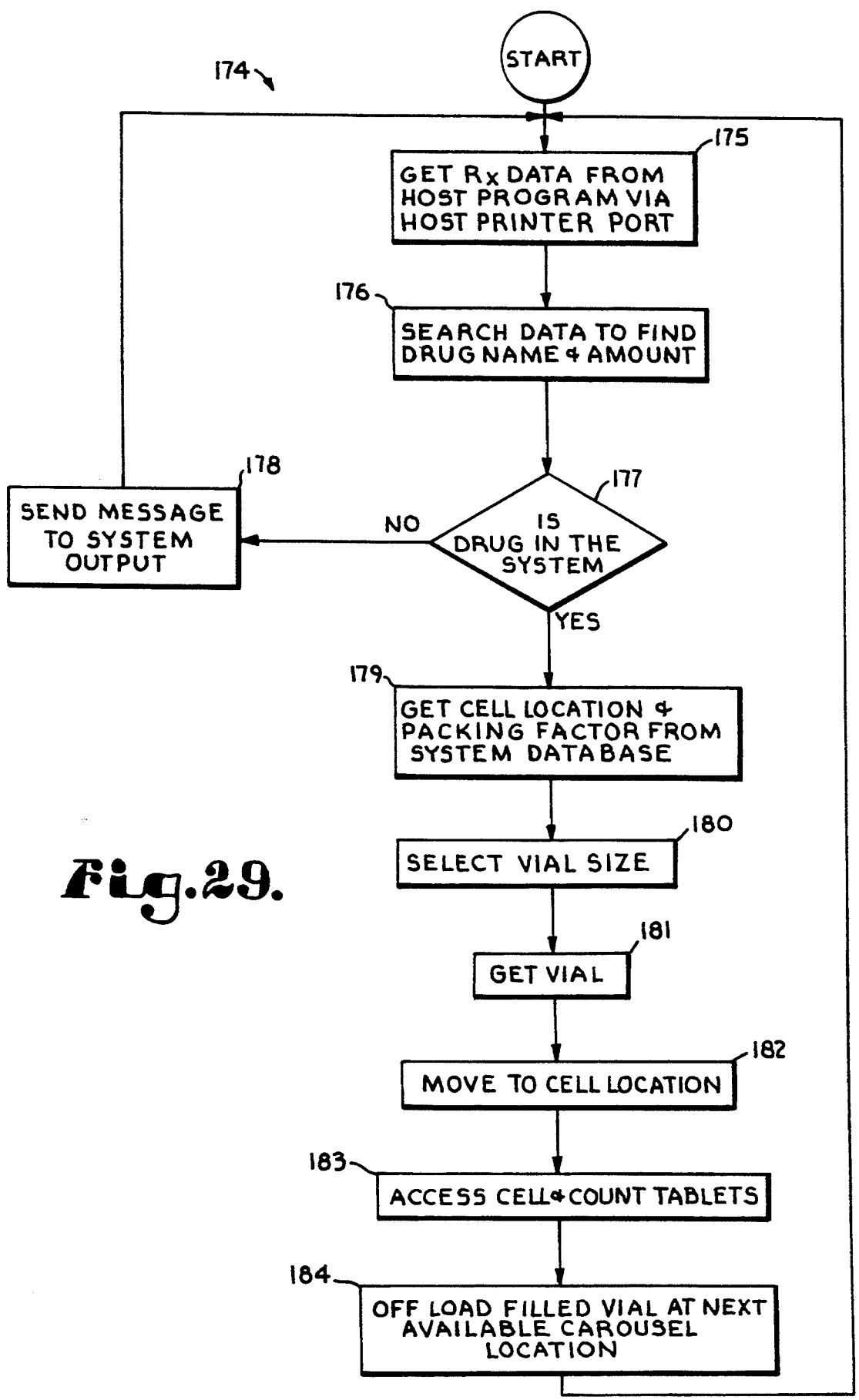
FIG. 29 is a simplified flow diagram illustrating the overall program logic by which the automatic prescription dispensing system operates.

FIG. 29 illustrates, in simplified form, the overall program logic or program 174 by which the system controller 7 of the system 1 operates and illustrates symbolically an embodiment of a method according to the present invention. In step 175, the controller 7 obtains the prescription label data from the printer port 15 of the host computer 10 by way of a host interface 16. In step 176, the controller 7 searches the prescription data base 17 for the drug name extracted from the prescription label data. At branch 177, if the drug name is not found in the data base 17, the program branches to step 178 wherein an error message is sent to the system output, such as the display panel 31, and the program returns to step 175.

The spatial coordinates of each of the dispenser cells 5 are stored in memory within the controller 7, along with a drug name corresponding to the cell's location. In the data base 17, a packing factor is stored for each drug name within the system 1 which relates to the spatial volume of each pill 12 of the drug and the volume of each vial size available in the vial supply assemblies 3. In step 179, if the required drug name is in the data base 17, the packing factor for the drug is obtained and multiplied by the required pill quantity to determine the required size of vial 11 and to select the vial size at step 180.

The controller 7 then activates the vial manipulator assembly 6 to obtain a vial 11 of the correct size from the selected vial supply assembly 3 in step 181, and move the gripped vial 11 to the selected dispenser cell 5 in step 182. At step 183, the dispenser drive motor 94 is activated to cause the selected dispenser cell 5 to dispense pills 12 into the vial 11 and count and weigh the pills 12 to ensure accuracy of the count. At step 184, the vial manipulator 6 is activated to convey the filled vial 11 to the offload carousel 4 where the filled vial 11 is deposited on the next available carousel sector 167. Finally, the program 174 returns to step 175 to await the next prescription to be filled.

While the system 1 has been described and illustrated as receiving prescription data from the host computer 10 through the printer port 15 thereof, the system 1 could also receive such prescription data by way of manual entry by the pharmacist on a keyboard (not shown) interfaced to the controller 7 or vocally through a voice recognition system (not shown) interfaced to the controller 7. Thus, the present invention is intended to encompass such modifications of the system 1 described and illustrated.

It is to be understood that while certain forms of the present invention have been illustrated and described herein, it is not to be limited to the specific forms or arrangement of parts described and shown.

What is claimed and desired to be secured by Letters Patent is as follows:

1. An automatic prescription dosage unit dispenser system for use with pharmacy host computer means having a printer port normally transferring prescription data, including dosage unit quantity data, to a prescription label printer, said system comprising:
   (a) dosage unit dispenser means controllable to dispense a selected quantity of prescription dosage units;
   (b) dispenser interface means coupled to said printer port and intercepting said dosage unit quantity data therefrom; and
   (c) dispenser control means coupling said interface means to said dispenser means and controlling said dispenser means to dispense said selected quantity of dosage units as derived from said dosage unit quantity data.

2. A system as set forth in claim 1 wherein said printer port normally transfers prescription name data to said label printer, and wherein:
   (a) said dispenser means is controllable to dispense a selected quantity of dosage units of a selected one of a plurality of prescription drugs identified by corresponding prescription names;
   (b) said interface means is operative to intercept said prescription name data from said printer port; and
   (c) said control means causes said dispenser means to dispense said selected quantity of dosage units of a selected one of said plurality of prescription drugs as derived from said prescription name data and said dosage quantity data.

3. A method of automatically dispensing prescription dosage units using dosage unit dispenser means in cooperation with pharmacy host computer means having a printer port normally transferring prescription data, including dosage unit quantity data, to a prescription label printer, said method comprising the steps of:
   (a) intercepting dosage unit quantity data from said printer port; and
   (b) controlling prescription dispenser means to dispense a quantity of dosage units as derived from said dosage unit quantity data.

4. A method as set forth in claim 3 wherein said printer port additionally transfers prescription name data to said label printer and wherein said dispenser means is controllable to dispense a selected quantity of dosage units of a selected one of a plurality of prescription drugs identified by corresponding prescription names, and including the steps of:
   (a) intercepting prescription name data from said printer port; and
   (b) controlling said dispenser means to select one of said plurality of prescription drugs to dispense, as derived from said prescription name data.

5. An automatic prescription dispensing system for dispensing a selected quantity of dosage units of a selected prescription drug into a prescription container and comprising:
   (a) frame means;
   (b) prescription dosage unit dispenser means mounted on said frame means and containing a stock of dosage units of said selected prescription drug;
   (c) prescription container supply means mounted on said frame means and containing a stock of prescription containers;
   (d) prescription offload means mounted on said frame means and adapted to receive a filled prescription container having a quantity of dosage units therein for retrieval of said filled container;
   (e) container manipulator means mounted on said frame means and controllable to retrieve a prescription container from said container supply means, convey said container to said dispenser means to receive a quantity of dosage units therefrom, and transfer the filled container to said offload means;
   (f) prescription data entry means to receive prescription data indicating at least a quantity of dosage units of said prescription drug to be dispensed;
   (g) control means coupled to said data entry means and said manipulator means; said control means operable for receiving said prescription data, controlling said manipulator means to retrieve said container and convey said container to said dispenser means, controlling the dispensing by said dispenser means of a quantity of dosage units of said prescription drug into said container as derived from said prescription data, and controlling said manipulator means to transfer said filled container to said offload means; and
   (h) pharmacy host computer interface means connecting said control means to a printer port of a pharmacy host computer and operative to intercept said prescription data from said port for use in controlling the operation of said system.

6. A system as set forth in claim 5 and including:
   (a) dosage unit counter means mounted on said manipulator means and coupled to said control means, said counter means sensing the dispensing of each dosage unit into a container whereby a count of dosage units dispensed into said container is controlled.

7. A system as set forth in claim 5 and including:

(a) prescription scale means mounted on said manipulator means and coupled to said control means, said scale means sensing the weight of dosage units dispensed into said container.

8. A system as set forth in claim 5 and including:
   (a) a plurality of container supply means mounted on said frame means, each container supply means holding a plurality of prescription containers of a respective size.

9. A system as set forth in claim 5 wherein said container supply means includes:
   (a) a container bin holding therein a plurality of prescription containers in random orientation;
   (b) a container retrieval platform; and
   (c) container pickup means operable to engage a container from said bin and deposit the engaged container onto said platform in a selected orientation.

10. A system as set forth in claim 5 and including:
    (a) a plurality of dispenser units mounted on said frame means in spaced relation, each dispenser unit containing a stock of dosage units of a respective prescription drug; and
    (b) said control means controlling said manipulator means to convey a container to a selected one of said dispenser units to receive a selected number of dosage units therefrom.

11. A system as set forth in claim 5 wherein said prescription offload includes:
    (a) a horizontally oriented offload carousel rotatably mounted on said frame means to enable rotation about a vertical carousel axis; and
    (b) carousel motor means engaged between said frame means and said carousel, coupled to said control means, and operable to rotate said carousel to revolve a filled prescription container deposited thereon to a pickup position.

12. A system as set forth in claim 11 wherein:
    (a) said carousel is circumferentially divided into a plurality of offload sectors; and
    (b) sector sensor means is mounted on said frame means, coupled to said control means, and operable to sense the presence of a container in one of said sectors.

13. An automatic prescription dispensing system for dispensing a selected quantity of dosage units of a selected prescription drug into a prescription container and comprising:
    (a) frame means;
    (b) prescription dosage unit dispenser means mounted on said frame means and containing a stock of dosage units of said selected prescription drug;
    (c) prescription container supply means mounted on said frame means and containing a stock of prescription containers;
    (d) prescription offload means mounted on said frame means and adapted to receive a filled prescription container having a quantity of dosage units therein for retrieval of said filled container;
    (e) container manipulator means mounted on said frame means and controllable to retrieve a prescription container from said container supply means, convey said container to said dispenser means to receive a quantity of dosage units therefrom, and transfer the filled container to said offload means;
    (f) prescription data entry means to receive prescription data indicating at least a quantity of dosage units of said prescription drug to be dispensed;
    (g) control means coupled to said data entry means and said manipulator means; said control means operable for receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means;
    (h) dosage unit counter means mounted on said manipulator means and coupled to said control means, said counter means sensing the dispensing of each dosage unit into a container whereby a count of dosage units dispensed into said container is controlled;
    (i) prescription scale means mounted on said manipulator means and coupled to said control means, said scale means sensing the weight of dosage units dispensed into said container; and
    (j) said control means additionally operable for comparing a count of dosage units dispensed into said container with a weight of dosage units dispensed into said container as a dispensing accuracy check.

14. An automatic prescription dispensing system for dispensing a selected quantity of dosage units of a selected prescription drug into a prescription container and comprising:
    (a) frame means;
    (b) a plurality of dispenser units mounted on said frame means in spaced relation, each dispenser unit containing a stock of dosage units of a respective prescription drug;
    (c) a plurality of container supply means mounted on said frame means, each container supply means holding a plurality of prescription containers of a respective size;
    (d) a horizontally oriented offload carousel rotatably mounted on said frame means to enable rotation about a vertical carousel axis and carousel motor means engaged between said frame means and said carousel and operable to rotate said carousel to revolve a filled prescription container deposited thereon to a pickup position;
    (e) container manipulator means mounted on said frame means and controllable to retrieve a prescription container from said container supply means, convey said container to said dispenser units to receive a quantity of dosage units therefrom, and transfer the filled container to said offload carousel;
    (f) prescription data entry means to receive prescription data indicating at least a quantity of dosage units of said prescription drug to be dispensed;
    (g) control means coupled to said data entry means, said manipulator means, and said offload carousel; said control means operable for receiving said prescription data, controlling said manipulator means to retrieve said container and convey said container to said dispenser means, controlling the dispensing of a quantity of dosage units of said prescription drug into said container as derived from said prescription data by said dispenser units, and controlling said manipulator means to transfer said filled container to said offload carousel; and
    (h) pharmacy host computer interface means connecting said control means to a printer port of a pharmacy host computer and operative to intercept said prescription data from said port for use in controlling the operation of said system.

15. A system as set forth in claim 14 wherein each of said container supply means includes:
(a) a container bin holding a plurality of prescription containers therein in random orientation;
(b) a container retrieval platform; and
(c) container pickup means operable to engage a container from said bin and deposit the engaged container onto said platform in a selected orientation.

16. A system as set forth in claim 15 wherein said container pickup means includes:
(a) a container pickup wheel mounted on said container supply means to enable rotation of said wheel about a horizontal wheel axis;
(b) said wheel including a hub with a plurality of pickup arms extending therefrom; and
(c) container pickup motor means drivingly engaging said wheel and operative to rotate said wheel to revolve said pickup arms through said plurality of containers to thereby stir said containers until at least one of said arms engages one of said containers, the engaged container thereafter being dropped onto said platform.

17. A system as set forth in claim 15 and including:
(a) platform container sensor means coupled to said container pickup means and positioned to sense a container on said platform, said container sensor means and said pickup means cooperating to cause operation of said pickup means when a container is not sensed on said platform and to cause said pickup means to cease operation when a container is sensed on said platform.

18. A system as set forth in claim 14 and including:
(a) dispenser drive means on said container manipulator means, said dispenser drive means being positioned to engage means on a selected dispenser unit to which a container is conveyed to thereby cause the operation of the selected dispenser unit.

19. A system as set forth in claim 14 wherein each of said dispenser units includes:
(a) a dispenser unit housing;
(b) a feed disk horizontally mounted within said dispenser unit housing to enable rotation about a vertical feed disk axis;
(c) dosage unit impeller means mounted axially on said feed disk and rotatable therewith;
(d) means forming a dosage unit supply trough oriented to feed dosage units onto said feed disk;
(e) feed control gate means positioned across a portion of said disk and engaging said impeller means, said gate means cooperating with said feed disk and said impeller means to admit dosage units through said gate means at a controlled rate;
(f) housing wall means forming a feed chamber in cooperation with said feed disk;
(g) a feed port formed through said wall means;
(h) a feed fence extending between said impeller means and said feed port; and
(i) said feed disk and feed fence cooperating to position dosage units fed through said gate in a single line along said fence, along which said dosage units are urged toward and through said feed port, one at a time, by rotation of said feed disk.

20. A system as set forth in claim 14 wherein said container manipulator means includes:
(a) horizontal motor means;
(b) vertical motor means;
(c) container grip means operatively engaged with said horizontal and vertical motor means and capable of releasably gripping a prescription container;
(d) said horizontal and vertical motor means being coupled to and cooperating with said control means to convey said grip means among said container supply means, said dispenser units, and said offload carousel; and
(e) vertical pivot motor means operatively connecting said container grip means to said horizontal and vertical motor means, said pivot motor means being coupled to said control means and cooperating therewith to enable pivoting said grip means about a vertical pivot axis.

21. A system as set forth in claim 14 wherein said container manipulator system includes:
(a) horizontal guide means mounted on said frame means;
(b) vertical support means slidably mounted on said horizontal guide means;
(c) horizontal motor means connected between said frame means and said vertical support means, coupled to said control means, and operable to move said vertical support means along said horizontal guide means;
(d) vertical guide means mounted on said vertical support means;
(e) manipulator frame means mounted on said vertical guide means to enable movement therealong;
(f) vertical motor means engaged between said vertical support means and said manipulator frame means, coupled to said control means, and operable to move said manipulator frame means along said vertical guide means;
(g) a manipulator arm connected to said vertical frame means to enable pivoting about a vertical arm axis;
(h) manipulator arm pivot motor means engaged between said manipulator frame means and said manipulator arm, coupled to said control means, and operable to pivot said arm about said arm axis; and
(i) container gripper means mounted on said manipulator arm and operable to releasably engage a container.

22. A system as set forth in claim 14 wherein:
(a) said carousel is circumferentially divided into a plurality of offload sectors; and
(b) sector sensor means is mounted on said frame means, coupled to said control means, and operable to sense the presence of a container in one of said sectors.

23. A discrete article dispenser unit comprising:
(a) a dispenser unit housing;
(b) a feed disk horizontally mounted within said dispenser unit housing to enable rotation about a vertical feed disk axis;
(c) dosage unit impeller means mounted axially on said feed disk and rotatable therewith;
(d) means forming a pelletized article supply trough oriented to feed pelletized articles onto said feed disk;
(e) feed control gate means positioned across a portion of said disk and engaging said impeller means, said gate means cooperating with said feed disk and said impeller means to admit said articles through said gate means at a controlled rate;

(f) housing wall means forming a feed chamber in cooperation with said feed disk;

(g) a feed port formed through said wall means;

(h) a feed fence extending between said impeller means and said feed port; and (i) said feed disk and feed fence cooperating to position said articles fed through said gate in a single line along said fence, along which said articles are urged toward and through said feed port, one at a time, by rotation of said feed disk.

24. A method of automatically dispensing prescription dosage units into a prescription container comprising the steps of:

(a) positioning a plurality of prescription unit dispenser cells in spaced relation on frame means, each dispenser cell containing dosage units of a respective prescription drug;

(b) positioning a plurality of prescription container supply means in spaced relation to said dispenser cells on said frame means;

(c) controlling container manipulator means to move to a selected one of said container supply means, retrieve a prescription container therefrom, and convey said container to a selected one of said dispenser cells;

(d) controlling the dispensing of a selected quantity of dosage units from said selected dispenser cell into said container;

(e) controlling said container manipulator means to convey the filled prescription container means to an offload position and release said filled container at said offload position, and (f) controlling the dispensing of said dosage units from said selected dispenser cell by causing the driving engagement of and activation of dispenser drive means on said manipulator means with driven means on said dispenser cell to thereby operate said dispenser cell.

25. An automatic prescription dispensing system for dispensing a selected quantity of dosage units of a selected prescription drug into a prescription container and comprising:

(a) frame means;

(b) prescription dosage unit dispenser means mounted on said frame means for containing a stock of dosage units of said selected prescription drug;

(c) prescription container supply means mounted on said frame means for containing a stock of prescription containers, said container supply means including a container bin for holding therein a plurality of prescription containers in random orientation, a container retrieval platform, and container pickup means operable to engage a container from said bin and deposit the engaged container onto said platform in a selected orientation, said container pickup means comprising a container pickup wheel having a hub with a plurality of pickup arms extending therefrom and mounted on said container supply means to enable rotation of said wheel about a horizontal wheel axis, and container pickup motor means drivingly engaging said wheel and operative to rotate said wheel to revolve said pickup arms through said plurality of containers to thereby stir said containers until at least one of said arms engages one of said containers, the engaged container thereafter being dropped onto said container retrieval platform;

(d) prescription offload means mounted on said frame means and adapted to receive a filled prescription container having a quantity of dosage units therein for retrieval of said filled container;

(e) container manipulator means mounted on said frame means and controllable to retrieve a prescription container from said container supply means, convey said container to said dispenser means to receive a quantity of dosage units therefrom, and transfer the filled container to said offload means;

(f) prescription data entry means to receive prescription data indicating at least a quantity of dosage units of said prescription drug to be dispensed; and (g) control means coupled to said data entry means and said manipulator means; said control means operable for receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means.

26. An automatic prescription dispensing system for dispensing a selected quantity of dosage units of a selected prescription drug into a prescription container and comprising:

(a) frame means;

(b) prescription dosage unit dispenser means mounted on said frame means and containing a stock of dosage units of said selected prescription drug;

(c) prescription container supply means mounted on said frame means and containing a stock of prescription containers, said container supply means including a container bin holding therein a plurality of prescription containers in random orientation, a container retrieval platform, and container pickup means operable to engage a container from said bin and deposit the engaged container onto said platform in a selected orientation;

(d) prescription offload means mounted on said frame means and adapted to receive a filled prescription container having a quantity of dosage units therein for retrieval of said filled container;

(e) container manipulator means mounted on said frame means and controllable to retrieve a prescription container from said container supply means, convey said container to said dispenser means to receive a quantity of dosage units therefrom, and transfer the filled container to said offload means;

(f) prescription data entry means to receive prescription data indicating at least a quantity of dosage units of said prescription drug to be dispensed;

(g) control means coupled to said data entry means and said manipulator means; said control means receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means; and (h) platform container sensor means coupled to said container pickup means and positioned to sense a container on said platform, said container sensor means and said pickup means cooperating to cause operation of said pickup means when a container is not sensed on said platform and to cause said pickup means to cease operation when a container is sensed on said container retrieval platform.

27. An automatic prescription dispensing system for dispensing a selected quantity of dosage units of a selected prescription drug into a prescription container and comprising:
(a) frame means;
(b) prescription dosage unit dispenser means mounted on said frame means and containing a stock of dosage units of said selected prescription drug;
(c) prescription container supply means mounted on said frame means and containing a stock of prescription containers;
(d) prescription offload means mounted on said frame means and adapted to receive a filled prescription container having a quantity of dosage units therein for retrieval of said filled container;
(e) container manipulator means mounted on said frame means and controllable to retrieve a prescription container from said container supply means, convey said container to said dispenser means to receive a quantity of dosage units therefrom, and transfer the filled container to said offload means;
(f) prescription data entry means to receive prescription data indicating at least a quantity of dosage units of said prescription drug to be dispensed;
(g) control means coupled to said data entry means and said manipulator means; said control means operable for receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means;
(h) a plurality of dispenser units mounted on said frame means in spaced relation, each dispenser unit container a stock of dosage units of a respective prescription drug, said control means controlling said manipulator means to convey a container to a selected one of said dispenser units to receive a selected number of dosage units therefrom; and
(i) dispenser drive means positioned on said container manipulator means, said dispenser drive means being positioned to drivingly engage means on a selected dispenser unit to which a container is conveyed to thereby cause the operation of the selected dispenser unit.

28. An automatic prescription dispensing system for dispensing a selected quantity of dosage units of a selected prescription drug into a prescription container and comprising:
(a) frame means;
(b) prescription dosage unit dispenser means mounted on said frame means and containing a stock of dosage units of said selected prescription drug;
(c) prescription container supply means mounted on said frame means and containing a stock of prescription containers;
(d) prescription offload means mounted on said frame means and adapted to receive a filled prescription container having a quantity of dosage units therein for retrieval of said filled container;
(e) container manipulator means mounted on said frame means and controllable to retrieve a prescription container from said container supply means, convey said container to said dispenser means to receive a quantity of dosage units therefrom, and transfer the filled container to said offload means;
(f) prescription data entry means to receive prescription data indicating at least a quantity of dosage units of said prescription drug to be dispensed; and
(g) control means coupled to said data entry means and said manipulator means; said control means operable for receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means, wherein said dispenser means includes at least one dispenser unit, said dispenser unit including: a dispenser unit housing; a feed disk horizontally mounted within said dispenser unit housing to enable rotation about a vertical feed disk axis; dosage unit impeller means mounted axially on said feed disk and rotatable therewith; means forming a dosage unit supply trough oriented to feed dosage units onto said feed disk; feed control gate means positioned across a portion of said disk and engaging said impeller means, said gate means cooperating with said feed disk and said impeller means to admit dosage unit through said gate means at a controlled rate; housing wall means forming a feed chamber in cooperation with said feed disk; a feed port formed through said wall means; and a feed fence extending between said impeller means and said feed port, wherein said feed disk and feed fence cooperate to position dosage units fed through said gate in a single line along said fence, along which said dosage units are urged toward and through said feed port, one at a time, by rotation of said feed disk.

29. An automatic prescription dispensing system for dispensing a selected quantity of dosage units of a selected prescription drug into a prescription container and comprising:
(a) frame means;
(b) prescription dosage unit dispenser means mounted on said frame means and containing a stock of dosage units of said selected prescription drug;
(c) prescription container supply means mounted on said frame means and containing a stock of prescription containers;
(d) prescription offload means mounted on said frame means and adapted to receive a filled prescription container having a quantity of dosage units therein for retrieval of said filled container;
(e) container manipulator means mounted on said frame means and controllable to retrieve a prescription container from said container supply means, convey said container to said dispenser means to receive a quantity of dosage units therefrom, and transfer the filled container to said offload means;

(f) prescription data entry means to receive prescription data indicating at least a quantity of dosage units of said prescription drug to be dispensed; and (g) control means coupled to said data entry means and said manipulator means; said control means operable for receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means, wherein said control manipulator means includes: horizontal motor means; vertical motor means; and container grip means operatively engaged with said horizontal and vertical motor means and capable of releasably gripping a prescription container, wherein said horizontal and vertical motor means is coupled to and cooperating with said control means to convey said grip means along said vial supply means, said dispenser means, and said offload means.

30. A system as set forth in claim 29 and including:
(a) vertical pivot motor means operatively connecting said container grip means to said horizontal and vertical motor means, said pivot motor means being coupled to said control means and cooperating therewith to enable pivoting said grip means about a vertical pivot axis.

31. An automatic prescription dispensing system for dispensing a selected quantity of dosage units of a selected prescription drug into a prescription container and comprising:
(a) frame means;
(b) prescription dosage unit dispenser means mounted on said frame means and containing a stock of dosage units of said selected prescription drug;
(c) prescription container supply means mounted on said frame means and containing a stock of prescription containers;
(d) prescription offload means mounted on said frame means and adapted to receive a filled prescription container having a quantity of dosage units therein for retrieval of said filled container;
(e) container manipulator means mounted on said frame means and controllable to retrieve a prescription container from said container supply means, convey said container to said dispenser means to receive a quantity of dosage units therefrom, and transfer the filled container to said offload means;
(f) prescription data entry means to receive prescription data indicating at least a quantity of dosage units of said prescription drug to be dispensed;
(g) control means coupled to said data entry means and said manipulator means; said control means operable for receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means; and
(h) dispenser drive means mounted on said container manipulator means and operative to engage and drive said dispenser means when said manipulator means conveys a container to said dispenser means.

32. An automatic prescription dispensing system for dispensing a selected quantity of dosage units of a selected prescription drug into a prescription container and comprising:
(a) frame means;
(b) prescription dosage unit dispenser means mounted on said frame means and containing a stock of dosage units of said selected prescription drug;
(c) prescription container supply means mounted on said frame means and containing a stock of prescription containers;
(d) prescription offload means mounted on said frame means and adapted to receive a filled prescription container having a quantity of dosage units therein for retrieval of said filled container;
(e) container manipulator means mounted on said frame means and controllable to retrieve a prescription container from said container supply means, convey said container to said dispenser means to receive a quantity of dosage units therefrom, and transfer the filled container to said offload means;
(f) prescription data entry means to receive prescription data indicating at least a quantity of dosage units of said prescription drug to be dispensed; and
(g) control means coupled to said data entry means and said manipulator means; said control means receiving said prescription data, controlling said manipulator means to retrive said container and convey said container to said dispenser means, controlling the dispensing by said dispenser means of a quantity of dosage units of said prescription drug into said container as derived from said prescription data, and controlling said manipulator means to transfer said filled container to said offload means, wherein said container manipulator means includes: horizontal guide means mounted on said frame means; vertical support means slidably mounted on said horizontal guide means; horizontal motor means connected between said frame means and said vertical support means, coupled to said control means, and operable to move said vertical support means along said horizontal guide means; vertical guide means mounted on said vertical support means; manipulator frame means mounted on said vertical guide means to enable movement therealong; vertical motor means engaged between said vertical support means and said manipulator frame means, coupled to said control means, and operable to move said manipulator frame means along said vertical guide means; a manipulator arm connected to said vertical frame means to enable pivoting about a vertical arm axis; manipulator arm pivot motor means engaged between said manipulator frame means and said manipulator arm, coupled to said control means, and operable to pivot said arm about said arm axis; and container gripper means mounted on said manipulator arm and operable to releasably engage a container.

33. A method of automatically dispensing prescription dosage units into a prescription container comprising the steps of:
(a) positioning a plurality of prescription unit dispenser cells in spaced relation on frame means, each dispenser cell containing dosage units of a respective prescription drug;

(b) positioning a plurality of prescription container supply means in spaced relation to said dispenser cells on said frame means;

(c) controlling container manipulator means to move to a selected one of said container supply means, retrieve a prescription container therefrom, and convey said container to a selected one of said dispenser cells;

(d) controlling the dispensing of a selected quantity of dosage units from said selected dispenser cell into said container;

(e) controlling said container manipulator means to convey the filled prescription container means to an offload position and release said filled container at said offload position;

(f) intercepting prescription print label data, including drug name data and drug quantity data, from a pharmacy host computer;

(g) extracting said drug name data and said drug quantity data from said prescription data;

(h) employing said drug name data to control the movement of said container manipulator means to said selected dispenser cell; and (i) employing said drug quantity data to control the number of dosage units dispensed into said container.

34. A method of automatically dispensing prescription dosage units into a prescription container comprising the steps of:

(a) positioning a plurality of prescription unit dispenser cells in spaced relation on frame means, each dispenser cell containing dosage units of a respective prescription drug;

(b) positioning a plurality of prescription container supply means in spaced relation to said dispenser cells on said frame means;

(c) controlling container manipulator means to move to a selected one of said container supply means, retrieve a prescription container therefrom, and convey said container to a selected one of said dispenser cells;

(d) controlling the dispensing of a selected quantity of dosage units from said selected dispenser cell into said container;

(e) controlling said container manipulator means to convey the filled prescription container means to an offload position and release said filled container at said offload position;

(f) counting the quantity of dosage units dispensed into said container;

(g) sensing the weight of the dosage units dispensed into said container; and (h) automatically comparing the counted quantity of dosage units with the sensed weight of said dosage units to thereby determine if said container is filled with the correct number of dosage units.

* * * * *